(12) United States Patent
Lynch et al.

(10) Patent No.: US 7,682,585 B2
(45) Date of Patent: Mar. 23, 2010

(54) SILICON REFINING PROCESS

(75) Inventors: David C. Lynch, Tucson, AZ (US); Harald A. Øye, Trondheim (NO)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 371 days.

(21) Appl. No.: 11/785,114

(22) Filed: Apr. 16, 2007

(65) Prior Publication Data

US 2007/0245854 A1   Oct. 25, 2007

Related U.S. Application Data

(60) Provisional application No. 60/794,695, filed on Apr. 25, 2006.

(51) Int. Cl.
*C01B 33/02* (2006.01)
(52) U.S. Cl. .................. 423/348; 423/349; 423/350; 423/327.1
(58) Field of Classification Search .................. None
See application file for complete search history.

(56) References Cited

U.S. PATENT DOCUMENTS

| | | | | |
|---|---|---|---|---|
| 3,650,732 A | * | 3/1972 | Scott et al. ............ 75/419 |
| 4,241,037 A | | 12/1980 | Pelosini et al. ............ 423/348 |
| 4,312,849 A | * | 1/1982 | Kramer ............ 423/348 |
| 4,612,179 A | | 9/1986 | Sanjurjo et al. ............ 423/348 |
| 5,208,001 A | | 5/1993 | Truitt et al. ............ 423/348 |
| 5,972,107 A | | 10/1999 | Schmid et al. ............ 117/79 |
| 6,368,403 B1 | | 4/2002 | Schmid et al. ............ 117/79 |
| 2005/0053539 A1 | | 3/2005 | Baluais et al. ............ 423/348 |
| 2005/0139148 A1 | | 6/2005 | Fujiwara et al. ............ 117/13 |

FOREIGN PATENT DOCUMENTS

| | | |
|---|---|---|
| CA | 2 043 492 | 5/2000 |
| DE | 29 44 975 | 5/1980 |
| DE | 3201312 | 7/1983 |
| EP | 0 855 367 | 7/1998 |

(Continued)

OTHER PUBLICATIONS

James Van Den Avyle et al., Silicon Purification Melting for Photovoltaic Applications, pp. 3-53, Apr. 2000.

(Continued)

*Primary Examiner*—Melvin C Mayes
*Assistant Examiner*—Smita Patel
(74) *Attorney, Agent, or Firm*—Patentability Associates

(57) ABSTRACT

Nitrogen and aluminum and fluxing agents ($Al_2O_3$, $SiO_2$, CaO and MgO) are added to molten silicon to create an oxy-nitride slag that acts as a sink for dissolved boron and phosphorus. The nitrogen can be added by bubbling nitrogen gas through the molten silicon; the aluminum can be added as aluminum metal or as $Al_2O_3$. Normally, the silicon must initially be deoxidized to allow the boron and phosphorus refining reactions to occur. The process may be followed by oxidative refining, SiC settling, the Silgrain process and directional solidification to remove other impurities and produce silicon suitable for use in solar cells. In an alternative version of the process, the molten silicon is passed through a particulate bed formed of a nitrogen-containing compound and an aluminum-containing compound.

31 Claims, 13 Drawing Sheets

FOREIGN PATENT DOCUMENTS

| | | |
|---|---|---|
| EP | 0 867 405 | 9/1998 |
| EP | 1 777 196 | 4/2007 |
| JP | 60-251112 | 12/1985 |
| JP | 10-120412 | 5/1998 |
| JP | 10-130011 | 5/1998 |
| JP | 10-182134 | 7/1998 |
| JP | 10-182136 | 7/1998 |
| JP | 10-273311 | 10/1998 |
| JP | 11-199217 | 7/1999 |
| JP | 11-209119 | 8/1999 |
| JP | 11-335114 | 12/1999 |
| JP | 2000-7318 | 1/2000 |
| JP | 2001-58811 | 3/2001 |
| JP | 2002-29727 | 1/2002 |
| JP | 2006-207850 | 8/2006 |
| WO | WO 98/16466 | 4/1998 |
| WO | WO 02/16265 | 2/2002 |
| WO | WO 03/066523 | 8/2003 |
| WO | WO 03/097528 | 11/2003 |
| WO | WO 2005/063621 | 7/2005 |
| WO | WO 2006/006487 | 1/2006 |
| WO | WO 2006/061944 | 6/2006 |
| WO | WO 2006/085679 | 8/2006 |
| WO | WO 2006/095662 | 9/2006 |
| WO | WO 2006/095664 | 9/2006 |
| WO | WO 2006/095665 | 9/2006 |

OTHER PUBLICATIONS

T.F. Ciszek et al., Alternative Solar-Grade Silicon Feedstock Approaches, National Renewable Energy Laboratory, 4 pages, Oct. 2001.

C.P. Khattak et al., Production of Solar Grade (SoG) Silicon by Refining Liquid Metallurgical Grade (MG) Silicon, National Renewable Energy Laboratory, pp. i-v, 1-40, Report Documentation Page, Apr. 19, 2001.

Chandra P. Khattak et al., Upgrading Metallurgical Grade (MG) Silicon For Use As Solar Grade Feedstock, IEEE Electron Devices Society (USA), cover page And pp. 49-52, Sep. 15-22, 2000.

Kazuhiko Iwai et al., Development of an Induction Melting Process for Materials with Low Electrical Conductivity or High Melting Point, Metall. Trans B, 24B, pp. 259-264, Apr. 1993.

T.F. Ciszek, Some Applications of Cold Crucible Technology for Silicon Photovoltaic Material Preparation, J. Electrochem. Soc., 132, pp. 963-968, Apr. 1985.

Chandra P. Khattak et al., A simple process to remove boron from metallurgical grade silicon, Solar Energy Materials & Solar Cells, 74, pp. 77-89, 2002.

R.K. Galgali et al., Studies On Slag Refining And Directional Solidification In The Purification Of Silicon, Solar Energy Materials, 16, pp. 297-307, 1987.

H.C. Theuerer, Removal of Boron from silicon by Hydrogen Water Vapor Treatment, J. of Metals, pp. 1316-1319, Oct. 1956.

Hiroyasu Fujiwara et al., Distribution Equilibria of the Metallic Elements and Boron between Si Based Liquid Alloys and $CaO-Al_2O_3$-$SiO_2$ Fluxes, J. Japan Inst. Metals, 60, pp. 65-71, 1996.

D.C. Lynch et al., The Search for a Low Cost Solar-Grade Silicon, silicon for the Chem. Ind. VII, pp. 1-12, Sep. 21-24, 2004.

J.J. Pak et al., Soda Slag System for Hot Metal Dephosphorization, Metall. Trans. B, 17B, pp. 797-804, 1986.

Hiroyasu Fujiwara et al., Reducing Removal of Phosphorous from Calcium Containing Silicon Alloys, Mat. Trans., JIM, 37, pp. 923-926, 1996.

Press Release, Solarvalue—The next steps, pp. 1-3, Nov. 17, 2006, Berlin.

Kepler Equities Alternative Energies Conference, Paris, Feb. 1, 2007, pp. 1-23.

Anders Schei et al., Production of High Silicon Alloys, Tapir, pp. 284-291, 1998, Trondheim.

\* cited by examiner

SILICON REFINING PROCESS

This application claims the priority of provisional Patent Application No. 60/794,695, filed Apr. 25, 2006, which is incorporated herein by reference in its entirety.

FIELD OF THE INVENTION

This invention relates to processes for removing impurities from silicon and, in particular, to a process for removing boron and phosphorus from metallurgical-grade silicon to produce silicon that can be used in the manufacture of solar cells.

BACKGROUND OF THE INVENTION

Silicon is a primary component of most solar cells manufactured today. The essential photovoltaic mechanism for converting solar energy to electrical energy relies on a PN junction that is formed in a silicon wafer. The PN junction may be formed by implanting a P-type impurity into an N-type silicon, or vice-versa.

The solar cell industry has traditionally relied on silicon discarded by the electronics industry as a material source. This has significantly increased the cost of manufacturing a solar cell because the grade of silicon required for an integrated circuit or memory chip, for example, is far purer and hence more expensive than the silicon required for a solar cell. Boron and phosphorus are two impurities whose content is subject to limits in both electronic-grade silicon and solar-grade silicon. Yet, while the permissible quantity of boron in electronic-grade silicon (e-Si) is only about 0.0002 ppma (parts per million atomic), a level of 0.1 to 3 ppma is acceptable in solar-grade silicon (s-Si). Similarly, for phosphorus, e-Si requires a level of 0.0008 ppma or less, while a proportion in the range of 0.1 to 1.0 ppma can be tolerated in s-Si. In short, the solar industry has normally used silicon that contains boron and phosphorus in concentrations that are orders of magnitude lower than necessary.

This disparity has had a marked effect on the cost and economic viability of solar cells. The price of discarded e-Si wafers and off-spec silicon has typically varied between $45 and $55 per kg and has ranged as high as $150 per kg. These prices can be expected to climb as the demand for silicon by the solar cell industry rises and the availability of scrap e-Si declines. Currently, silicon accounts for approximately 25-40% of the cost of a solar cell, and this proportion is likely to increase as other production costs fall. Thus, a reduction in the cost of silicon would very significantly improve the economics of solar cells. For example, it has been estimated that a 40-50% reduction in the silicon cost would make electricity from solar cells competitive with peak residential rates of power supplied by utilities and that further advancements in solar cell technology might even make electricity from solar cells competitive with off-peak utility rates.

In terms of price, metallurgical grade silicon (m-Si) is an attractive alternative to e-Si, since m-Si sells for only about $1.80 per kg, or about 4% of the typical price of e-Si. Unrefined m-Si cannot be used to manufacture solar cells, however, because it contains a number of impurities—in particular, boron and phosphorus—in quantities that are far too high. Metallurgical-grade silicon contains 10-50 ppma boron and 15-50 ppma phosphorus. Comparing those levels with the quantities acceptable in s-Si (given above) reveals that the amounts of boron and phosphorus in m-Si must be reduced by approximately 90% and 99%, respectively, to make it suitable for use in solar cells. The quantities of other impurities, such as aluminum, calcium, chromium, copper and iron, must also be reduced, but generally there are known processes for removing these materials.

Thus, there is a clear and compelling need for a cost-effective process that can remove impurities from metallurgical-grade silicon, particularly boron and phosphorus, to the degree necessary to render the silicon usable in the manufacture of solar cells.

SUMMARY OF THE INVENTION

In the process of this invention, solid silicon is heated until it is molten, nitrogen and/or alumina or aluminum are added to the molten silicon, thereby forming a slag which contains nitrogen-containing compounds such as silicon nitride ($Si_3N_4$) and aluminum nitride (AlN), and/or oxygen-containing compounds such as alumina ($Al_2O_3$) and silica ($SiO_2$). Boron and/or phosphorus dissolved in the silicon enter the slag, and the molten silicon is separated from the slag.

The process may require pretreatment of the molten silicon to remove dissolved oxygen (deoxidation). This can be done, for example, by heating the molten silicon, or by a combination of heating and vacuum treatment of the molten silicon, to volatilize the dissolved oxygen as silicon monoxide (SiO) and carbon monoxide (CO), the latter being formed from carbon dissolved in the molten silicon. An inert or semi-inert gas may be injected into the molten silicon to hasten the removal of the dissolved oxygen. Before the gas is injected into the molten silicon, the oxygen content of the gas may be reduced, for example by passing the gas through a bed of heated metal pieces.

Nitrogen may be added to the molten silicon by injecting a stream of nitrogen gas into the molten silicon. Aluminum and/or alumina powder may be added to the silicon by melting the aluminum with the solid silicon and by a combination of reduction of the alumina and melting of the resulting aluminum with the silicon, or they may be added later to the molten silicon. Fluxing agents, such as alumina ($Al_2O_3$), silicon dioxide ($SiO_2$), calcium oxide (CaO) and magnesium oxide (MgO), may be introduced into the molten silicon as part of forming the slag. It is believed that the dissolved boron reacts with nitrogen dissolved in the silicon or with silicon nitride and enters the slag as BN and that the dissolved phosphorus reacts with aluminum dissolved in the silicon or alumina in the slag and enters the slag as AlP. Boron and phosphorus may also react with AlN in the slag to form BN and AlP, or AlN may interact with BN and AlP to reduce their activity in a slag or discard phase.

The process may be performed in a cold crucible induction melter. The cold crucible produces a layer of solidified slag or silicon that acts as both an inner crucible and a thermal barrier. Pre-seasoning the crucible with a layer of solidified slag significantly reduces the energy requirements of the process.

Alternatively, boron and phosphorus may be removed by passing the molten silicon through a bed of solids containing a nitrogen-containing compound and/or an aluminum-containing compound. The nitrogen-containing compound may include $Si_3N_4$ and AlN. The aluminum-containing compound may include $Al_2O_3$ and AlN. Other possible additives to the solid phase include MgO and CaO.

After the B and/or P have been removed, the silicon may be refined further to remove other impurities. The additional processes may include: oxidative refining; gettering of dissolved carbon by forming of SiC particulate upon cooling the molten silicon followed by settling of the particulate or precipitation of the SiC particulate on a solid surface; the Silgrain process; and directional solidification or zone refining.

In accordance with another aspect of the invention, silicon carbide particles are added to the silicon to grow larger SiC particles that settle faster, or the molten silicon containing the particles can be passed through a bed of larger SiC pieces to remove, by trapping and/or filtering, the smaller SiC particles from the molten silicon.

The cost savings made possible by the process of this invention has the potential to change how a large portion of electrical power is generated throughout the world. It can move solar power generation from limited use in remote locations to the primary choice of power for residential customers and many commercial applications. It can reduce the need to expand the existing electrical distribution system by moving power generation to the point of use. This will lead to more widely distributed facilities for electric power generation and thereby reduce the susceptibility of the nation's generation capacity to terrorist acts. Furthermore, the process also has the potential to reduce the nation's dependence on foreign oil and reduce greenhouse gas emissions.

The process for removing boron and phosphorus uses inexpensive, and easily handled reactants—namely $N_2$ and aluminum (the latter can be elemental or in a compound form such as alumina)—and does not produce any off gases that require special handling beyond dust control. The discard phase containing boron and phosphorus is inert and can be disposed of in landfills without further processing, or it can be reprocessed for its silicon content at facilities producing ferrosilicon or alloy silicon for the aluminum industry.

DESCRIPTION OF THE INVENTION

Figure 1A:
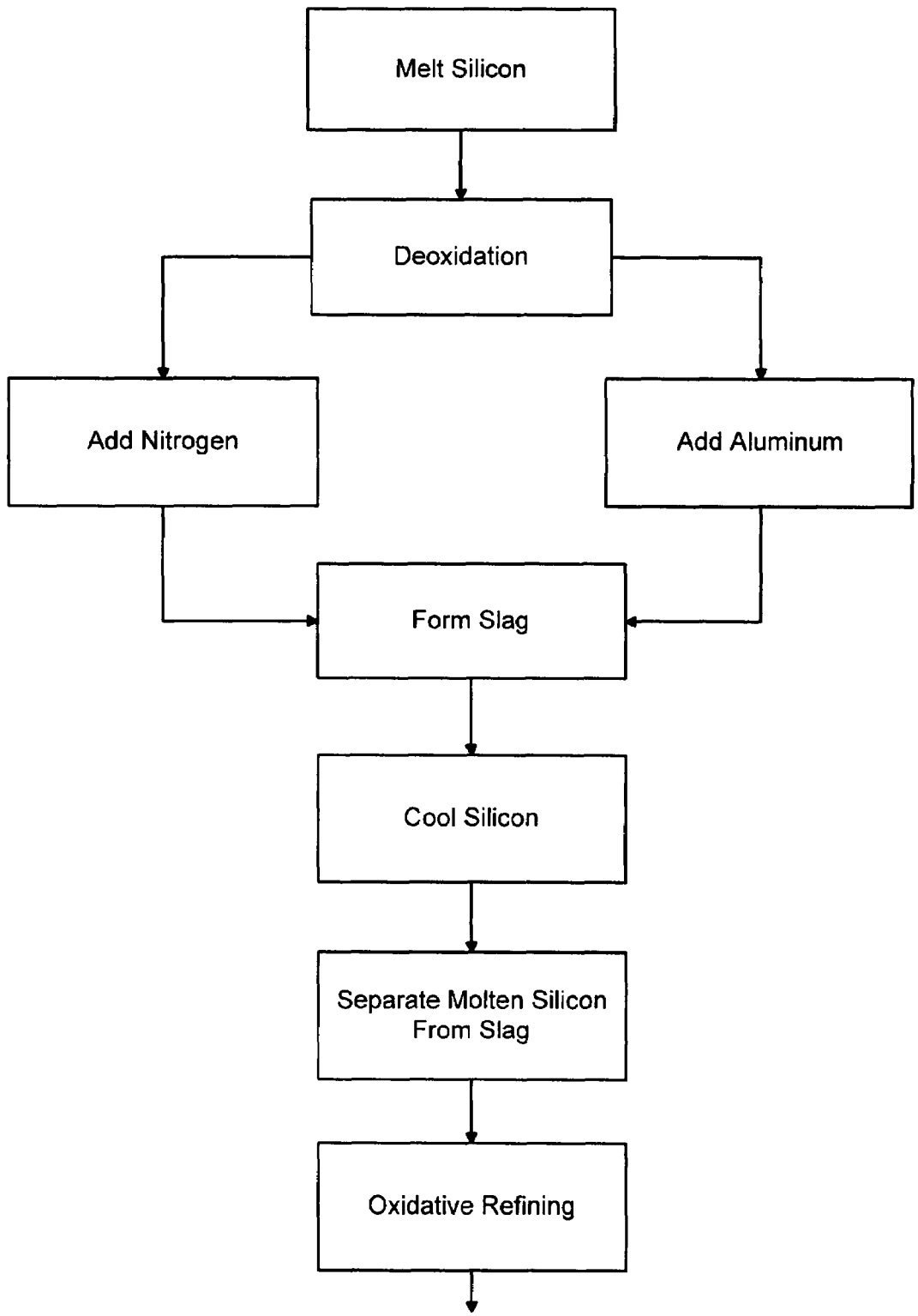
FIGS. 1A and 1B contain a conceptual flow chart of the process of this invention using a slag to remove boron and phosphorus.

The acceptable level of an impurity in silicon for use in solar cells is defined by a range. At the lower end of the range is a threshold level, typically taken as 88 to 90% of the maximum cell efficiency, below which reducing the impurity has diminishing impact on the conversion of solar energy to electrical energy. At the upper end of the range is a level beyond which the efficiency of the conversion process drops off linearly with the logarithm of the impurity concentration. Between these limits is the acceptable range of the impurity.

Table 1 lists the acceptable ranges for the significant impurities in solar-grade silicon (s-Si), as well as the concentrations of the same impurities in metallurgical-grade silicon (m-Si) and electronic-grade silicon (e-Si). All values are in parts per million atomic (ppma).

TABLE 1

| Impurity | m-Si | s-Si (p-type) | e-Si |
|---|---|---|---|
| Al | 1200-4000 | 0.08-0.5 | 0.0008 |
| B | 10-50 | 0.1-3 | 0.0002 |
| C | 700 | 60 | 0.5 |
| Ca | 590 | 0.1 | 0.003 |
| Cr | 50-140 | 0.006-0.05 | 0.003 |
| Cu | 24-90 | 0.3 | 0.003 |
| Fe | 1600-3000 | 0.02-0.3 | 0.010 |
| Mn | 70-80 | 0.015-0.05 | 0.003 |
| Mo | $\leq 10$ | $1.5 \times 10^{-5}$ | 0.003 |
| Ni | 40-80 | 0.1-0.2 | 0.010 |
| P | 15-50 | 0.1-1.0 | 0.0008 |
| Ti | 140-200 | 0.1 | 0.003 |
| V | 100-200 | $5 \times 10^{-5}$ | 0.003 |

It has been found that the most difficult of these impurities to remove are boron and phosphorus. As Table 1 indicates, if m-Si is to be refined to s-Si, boron must be reduced from 10-50 ppma to 0.1-3 ppma, or by about 90%; phosphorus must be reduced from 15-50 ppma to 0.1-1.0 ppma, or by about 97%.

In accordance with this invention, silicon is heated until it reaches a molten state. A slag containing nitrogen and aluminum is formed with the molten silicon. Boron is removed from the silicon by both nitrogen in the slag and nitrogen dissolved in the silicon, and phosphorus is removed from the silicon by both aluminum in the slag and aluminum dissolved in the silicon. In the slag, the nitrogen is there primarily as $Si_3N_4$ and AlN, while the aluminum in the slag is there primarily as $Al_2O_3$ and AlN. The boron dissolved in the molten silicon can react with the $Si_3N_4$ in the slag, partially stripping the $Si_3N_4$ of its nitrogen to form BN, which dissolves in the slag; or boron and nitrogen both dissolved in the molten silicon can react at the interface between the silicon and slag, forming BN, which likewise dissolves in the slag. The phosphorus dissolved in the molten silicon can react with the $Al_2O_3$ in the slag, partially stripping the $Al_2O_3$ of its aluminum to form AlP, which dissolves in the slag; or phosphorus and aluminum both dissolved in the molten silicon can react at the interface between the silicon and slag, forming AlP, which likewise dissolves in the slag. The presence of a significant concentration of AlN in the slag is expected to draw both BN and AlP into the slag, as boron substitutes for Al in AlN and phosphorus substitutes for N in AlN. Thus, if AlN is present and stable in the slag, BN and AlP will be able to substitute for AlN. It is also expected that MgO and CaO in the slag can react with phosphorus dissolved in the molten silicon to form $Mg_3P_2$ and $Ca_3P_2$ that dissolve in the slag.

Figure 1B:
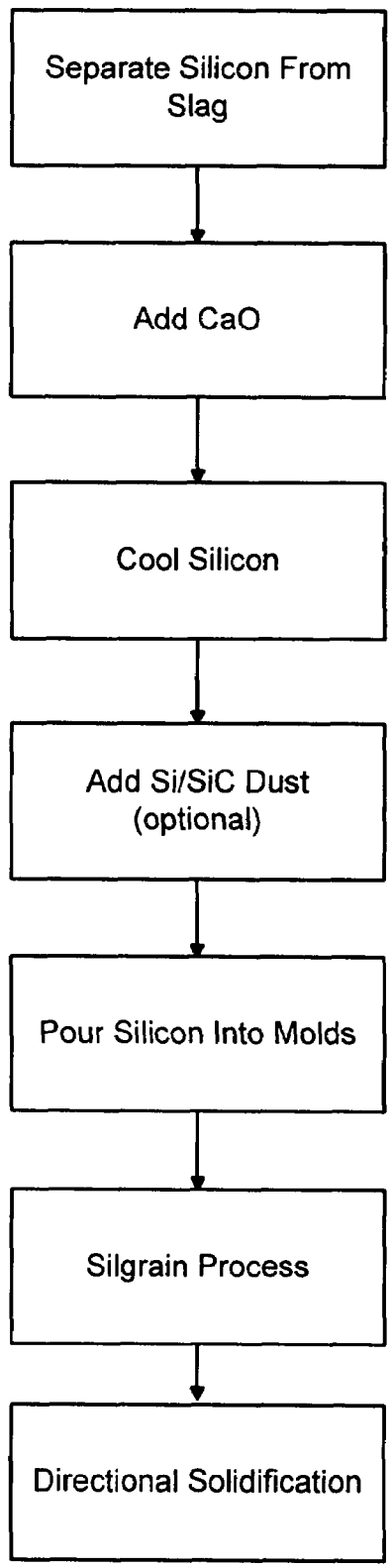
Figure 2:
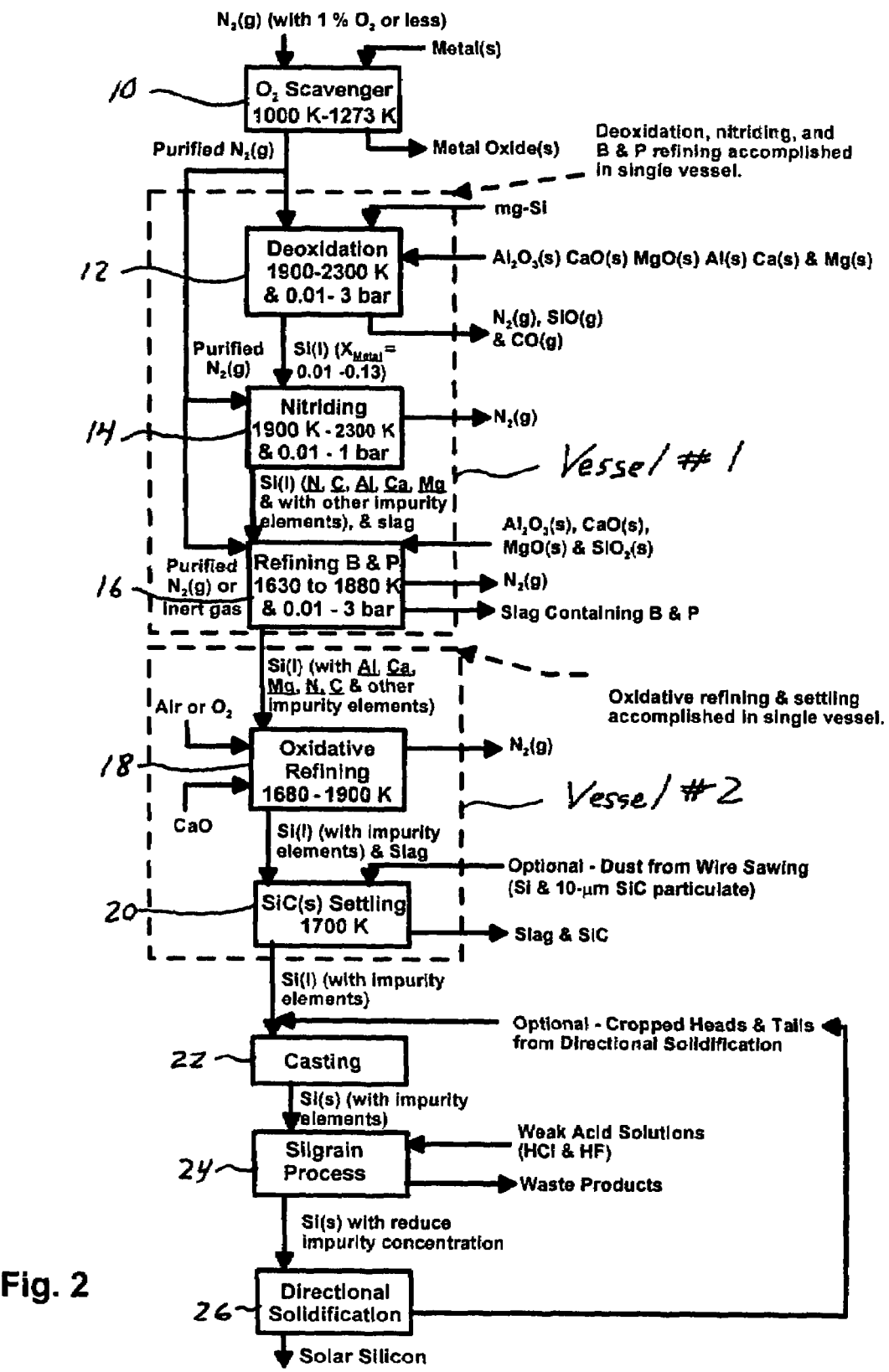
FIG. 2 contains a more detailed flow chart of the process, using one vessel for the deoxidation, nitriding, and boron and phosphorus refining processes and a second vessel for the oxidative refining process.

The flow chart shown in FIGS. 1A and 1B provides a conceptual overview of the process of this invention using a slag, as summarized above and described below. Further details of the process are illustrated graphically in the flow chart of FIG. 2. In the following description the references to the numbered boxes are to the numbers in FIG. 2.

Deoxidation of the Molten Silicon

Oxygen that is chemically adsorbed on the surface of the silicon blocks the chemical reactions that are necessary to both dissolve nitrogen in the silicon and form the nitrogen-containing slag. Since the extent that the surface of the silicon is covered by chemically adsorbed oxygen is linked to the concentration of dissolved oxygen in the silicon, removal of the dissolved oxygen opens up the surface of the silicon for dissolving nitrogen in silicon and/or the formation of silicon nitride. Therefore, oxygen that is dissolved in the silicon should be removed to the extent practicable before the refining processes are begun. (Box 12)

The dissolved oxygen can be removed by heating the molten silicon to a temperature in the range 1700 K to 2300 K, preferably 1900 K to 2300 K, in a vacuum (i.e., pressure in the range 0.01 bar to 3 bar). At these temperatures the dissolved oxygen reacts with the silicon to form gaseous silicon monoxide by means of the following reaction:

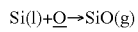

This reaction occurs at a relatively slow rate if nucleation must occur to get it started. The need for nucleation can be avoided by creating bubbles in the molten silicon, which also in effect improves the rate of formation of SiO by increasing the surface area at which the reaction can take place and reducing the concentration of SiO(g) in the bubbles.

Thus, according to one embodiment of this invention a gas is bubbled through the molten silicon to accelerate the removal of the dissolved oxygen. An inert gas, such as Ar or He, or a semi-inert gas, such as $N_2$ or $NH_3$ may be used for this purpose. As described below, nitrogen gas is particularly suitable. The gas may be injected into the molten silicon with a lance made of alumina or silicon carbide. A water cooled metal lance or a torch can also be used.

Deoxidation is typically performed at a pressure of 0.01 to 3 bar (preferably 0.01 to 0.1 bar). When the oxygen has been removed from the silicon, the nitrogen begins to dissolve in the silicon and a drop in pressure may be noted.

The oxygen content of the gas should initially be 1% or less, but the gas typically needs to be purified still further. Otherwise, significant amounts of the oxygen in the gas may become dissolved in the molten silicon, counteracting the deoxidation process.

Oxygen can be removed by passing the gas through a bed of heated solids in a tube furnace. (Box 10) The temperature of the solids is typically in the range of 673 K to 1273 K, preferably 1000 K to 1273 K. The pressure of the gas is normally in the range 0.01 bar to 3 bar, preferably 0.1 bar to 1 bar. Metals such as Cr, Mn, Ti, Al, Mg or Ca, or non-metallic elements such as Si, are highly efficient and remove substantially all of the oxygen. Cu, Co, Ni or Fe (or FeO or $Fe_3O_4$) are less efficient and remove only a portion of the oxygen. Whichever material is used, the oxygen in the gas forms an oxide layer on the surface of the solids, and at some point the oxide layer shields the metal and prevents the reaction from continuing. Materials in the second group (Cu, Co, Ni, Fe, FeO and $Fe_3O_4$) can be regenerated for reuse by passing hydrogen over the spent pieces. This is not possible with the first group (Cr, Mn, Ti, Al, Mg, Si and Ca).

Cu heated to about 1123 K may advantageously be used as an oxygen scavenger because the copper oxide that forms is not protective, in that it does not prevent $O_2$ from getting to the unreacted metal, and it can readily be reduced by passing hydrogen over the metal pieces to form water vapor, allowing the Cu pieces to be reused. Using Cu, the partial pressure of $O_2$ in the $N_2$ gas may be reduced to approximately $10^{-8}$ bar.

Any oxygen remaining in the gas bubbles may react with the molten silicon to form liquid silicon dioxide

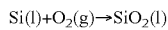

and the liquid silicon dioxide may in turn react with the molten silicon to form silicon monoxide gas.

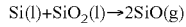

Alternatively, the oxygen in the gas may react with the silicon to form silicon monoxide directly

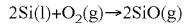

The partial pressure of SiO(g) formed by the $O_2$ entering with the semi purified $N_2$ is substantially below the equilibrium value and thus deoxidation of the molten silicon occurs by the reaction

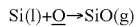

Typically the molten silicon will also contain dissolved carbon. Some of this carbon may combine with the dissolved oxygen to form carbon monoxide by the reaction

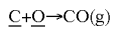

The silicon is preferably heated in a cold crucible equipped with an induction heater (commonly referred to as "skull" heater). Such units are available from CONSARC of 100 Indel Avenue, Rancocas, N.J. Other types of heaters may be used, however, including plasma with transferred and non-transferred arc. In a cold crucible, water is flowed through channels in the walls of the crucible to keep the walls relatively cool as compared to the molten silicon.

Figure 4A:
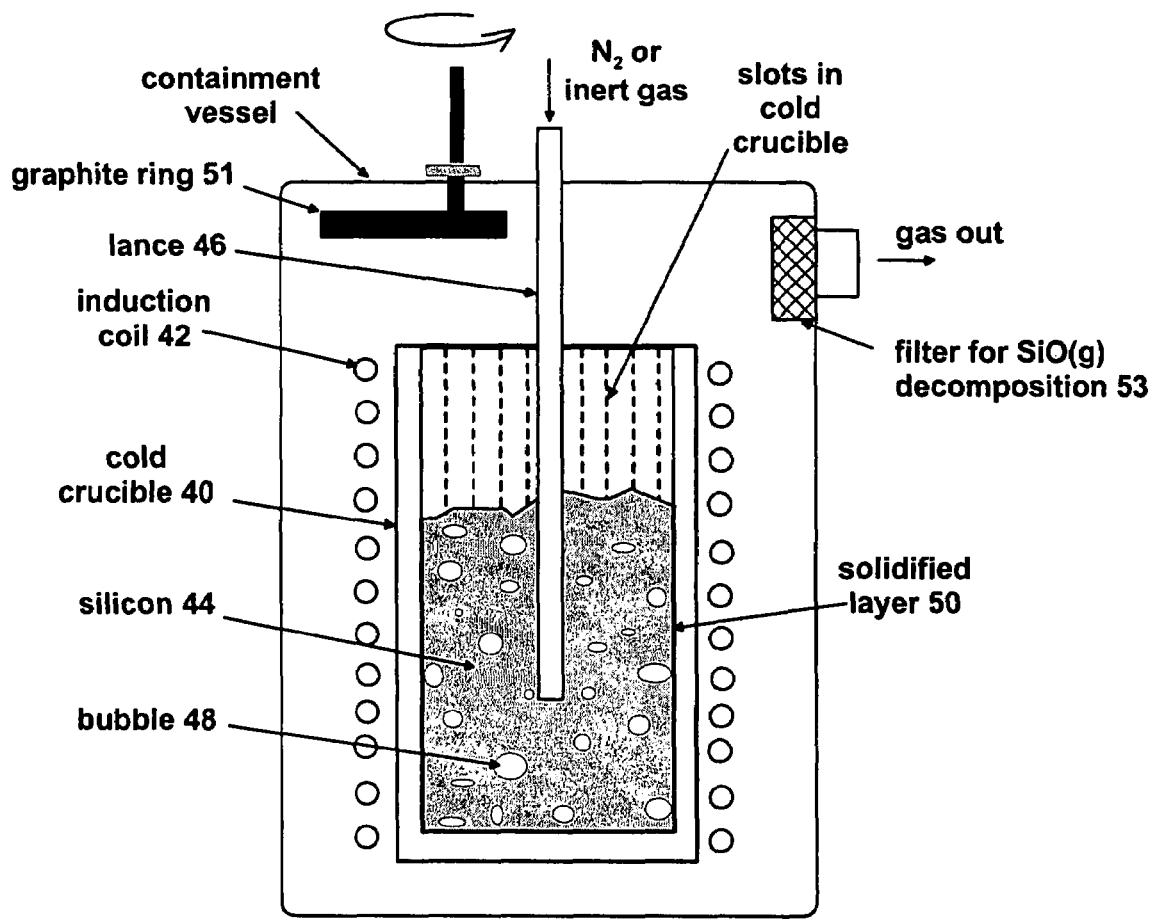
FIGS. 4A and 4B are cross-sectional views of a cold crucible induction heater during the deoxidation process, with nitrogen or an inert gas being added to the molten silicon using a lance and a torch, respectively.

FIG. 4A illustrates a cross-sectional view of a cold-crucible 40 enclosed by an induction heating coil 42. $N_2$ or an inert gas is injected into molten silicon 44 using a lance 46 to create bubbles 48 in the molten silicon 44. A layer 50 of solid silicon or slag (the "skull") forms on the walls of the crucible 40 and acts as a barrier to any chemical reactions between the molten silicon 44 and the cold crucible 40, thereby preventing the silicon from dissolving any additional impurities. The solid layer 50 also acts as a thermal barrier which reduces the amount of energy required in refining the silicon.

Figure 4B:
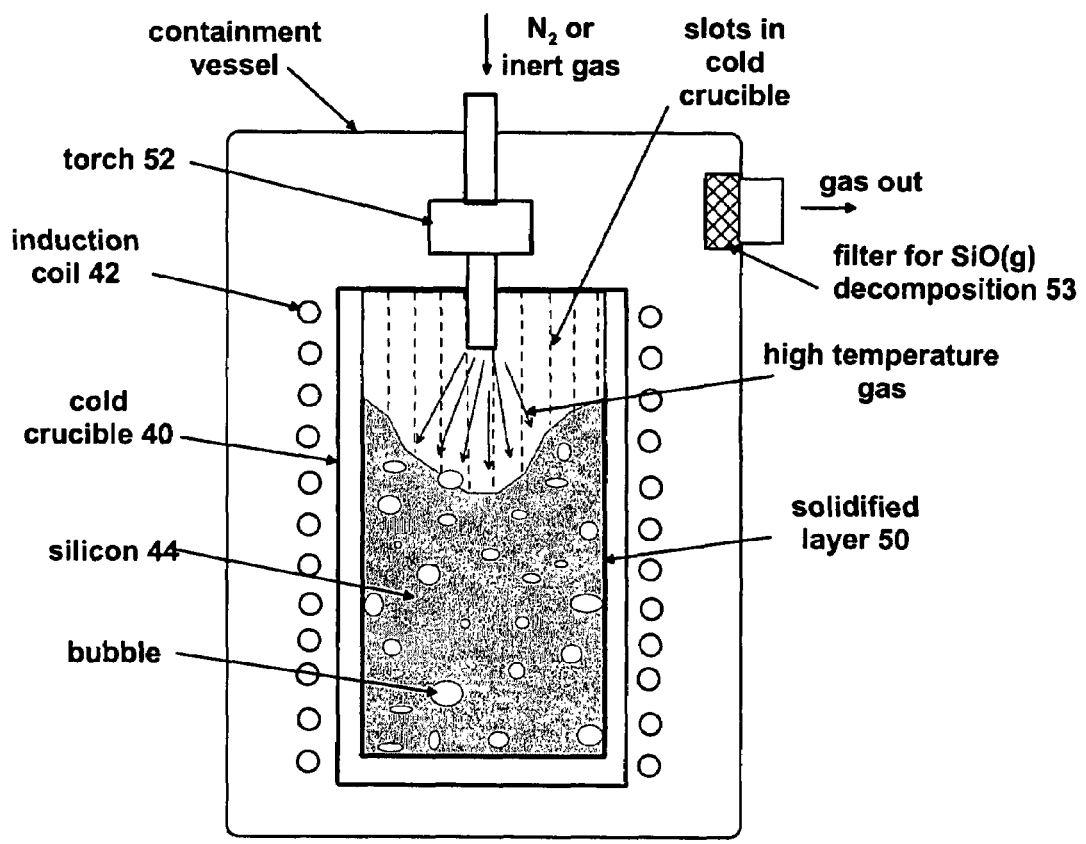

FIG. 4B shows a similar view of cold-crucible 40 during the deoxidation process, except that a torch 52 is used to inject heated $N_2$ or an inert gas into the molten silicon 44. The torch heats the gas to a temperature of 2500 K to 3500 K, forming a plasma. The expansion of the gas upon heating accelerates the gas stream that impinges on the melt, both stirring the melt and heating the surface of the melt to about 2300 K. At that temperature the residual oxygen in the gas reacts with the silicon by the reactions

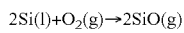

and

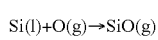

Oxygen dissolved in the silicon at the surface also reacts according to the reaction

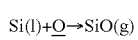

thereby removing dissolved oxygen from the silicon.

Since solid silicon does not act as a susceptor to electromagnetic energy, if an induction heater is used a susceptor such as an annular ring (or donut) of graphite is initially placed above but in near proximity to the solid silicon in the crucible. As shown in FIG. 4A, a graphite ring 51 may be used to heat up the solid silicon, and at temperatures above 700 K the silicon begins to act as a susceptor. The graphite ring 51 can then be removed, and the induction heating process thereafter is sustained by the silicon.

During the deoxidation of the silicon, the cold crucible is sealed and a mechanical vacuum pump may be used to reduce the pressure to 0.01 bar, for example. Since the silicon monoxide gas will condense as solid silicon dioxide and elemental silicon when cooled, a cool surface positioned upstream of the vacuum pump acts as a trap to remove the silicon monoxide gas. FIGS. 4A and 4B show a filter 53 near the exit port of the cold-crucible 40 for trapping silicon monoxide gas.

One or more of Al, Ca, Mg and their oxides ($Al_2O_3$, CaO and MgO) may be added to the molten silicon during the deoxidation process to increase the amount of calcium and magnesium dissolved in the silicon. This helps in the formation of the oxy-nitride slag, described below and also provides a reducing environment that helps to keep the oxygen level of the silicon at a low level.

Any other process that is capable of removing oxygen from silicon to the point where the silicon is capable of reacting with refining agents such as nitrogen or aluminum may be used in place of the process described above. For example, $NH_3$ may also be used to remove the oxygen from the molten silicon.

Addition of Nitrogen (Nitriding)

After substantially all of the oxygen has been removed from the molten silicon, nitrogen is added to assist in removal of boron (box 14).

An advantage of bubbling nitrogen gas through the molten silicon in the deoxidation process is that the same process can be used to add nitrogen to the silicon. At some point during the deoxidation process, the oxygen level in the molten silicon will be reduced to a level (e.g., approximately $5 \times 10^{-4}$ wt %) at which the nitrogen gas begins to dissolve in the silicon and to combine with the silicon to form silicon nitride. This occurs via the reactions

$N(g) \rightarrow \underline{N}$ (occurs with torch)

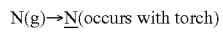

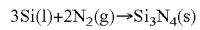

$3Si(l)+4N(g) \rightarrow Si_3N_4$(s and/or l) (occurs with torch)

Nitriding typically occurs at a temperature of 1900 to 2300 K and a pressure of 0.01 to 1 bar. With the torch, nitriding can occur at temperatures up to 2500 K.

Other nitrogen-containing gases such as ammonia ($NH_3$) may also be used in the nitriding process. It is also possible to react SiC with nitrogen to form $Si_3N_4$ by the reaction

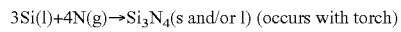

Alternatively, the nitrogen may be added by introducing nitrogen-containing solids such as $Si_3N_4$, AlN, $Ca_3N_2$, $Mg_3N_2$ and/or AlON to the molten silicon.

Figure 5A:
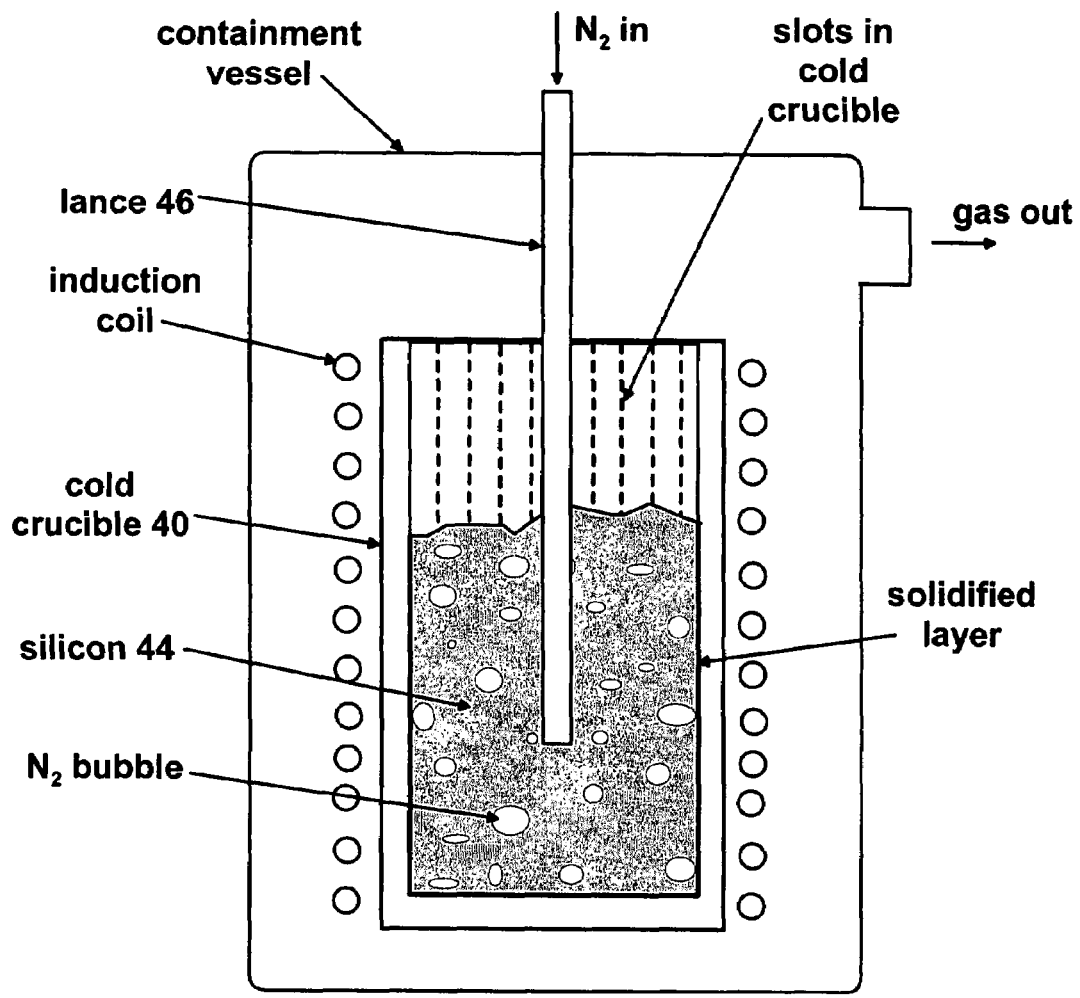
FIGS. 5A and 5B are cross-sectional views of a cold-crucible induction heater during the nitriding process, with nitrogen gas being added to the molten silicon using a lance and a torch, respectively.
Figure 5B:
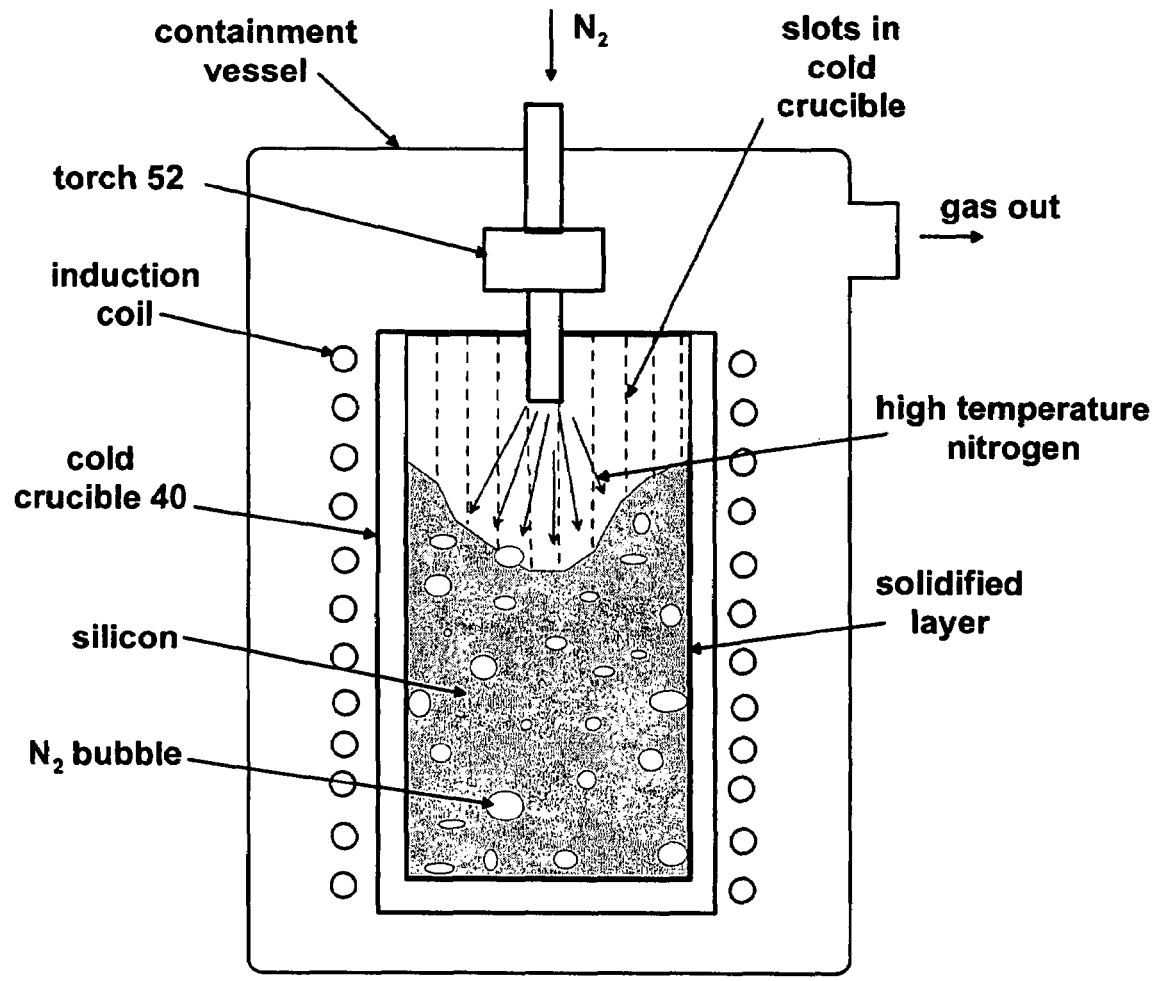

FIG. 5A shows a view of cold-crucible 40 during the nitriding process with lance 46 used to inject $N_2$ gas into the molten silicon 44. FIG. 5B is a similar view except that the $N_2$ gas is injected using torch 52.

Removal of Boron and Phosphorus (Refining) Using Slag

If phosphorus is to be removed from the silicon, aluminum or an aluminum-containing compound is added to the silicon at some point in the process. This can be done by heating alumina ($Al_2O_3$) powder or pieces of metallic aluminum with the silicon in the cold crucible heater or by adding $Al_2O_3$ powder or metallic aluminum to the molten silicon later, for example, during the deoxidation process. The metallic aluminum dissolves in the silicon. The alumina will produce dissolved aluminum and silicon monoxide or carbon monoxide via the following reactions

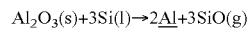

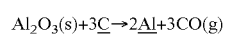

Some of the dissolved aluminum then combines with the nitrogen gas to form AlN through the reaction

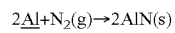

or by reaction between the aluminum and dissolved nitrogen

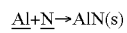

When $Si_3N_4$ and/or AlN begin to form, $Al_2O_3$, $SiO_2$, CaO and/or MgO may be added as fluxing agents. This may be done by injecting the fluxing agents in powdered form with the nitrogen or another inert gas or by simply charging the flux materials to the top of the melt. The solids, $Si_3N_4$ and AlN, formed during nitriding combine with the fluxing agents. The total mass of fluxing agents may be 10% to 50% of the mass of silicon being refined.

The result is the formation of a oxy-nitride slag with significant nitrogen (as $Si_3N_4$) and aluminum (as $Al_2O_3$ and AlN) content, which acts as a chemical sink for boron and phosphorus. It is believed that the addition of the fluxing agents (MgO and CaO) helps to reduce the temperature of the slag, and this in turn promotes the formation of BN and AlP (the latter from aluminum dissolved in the silicon). In addition, aluminum, magnesium, and calcium dissolved in the silicon are preferentially oxidized versus silicon and report to the slag, thus keeping the dissolved oxygen content in the silicon to a minimum.

Figure 6A:
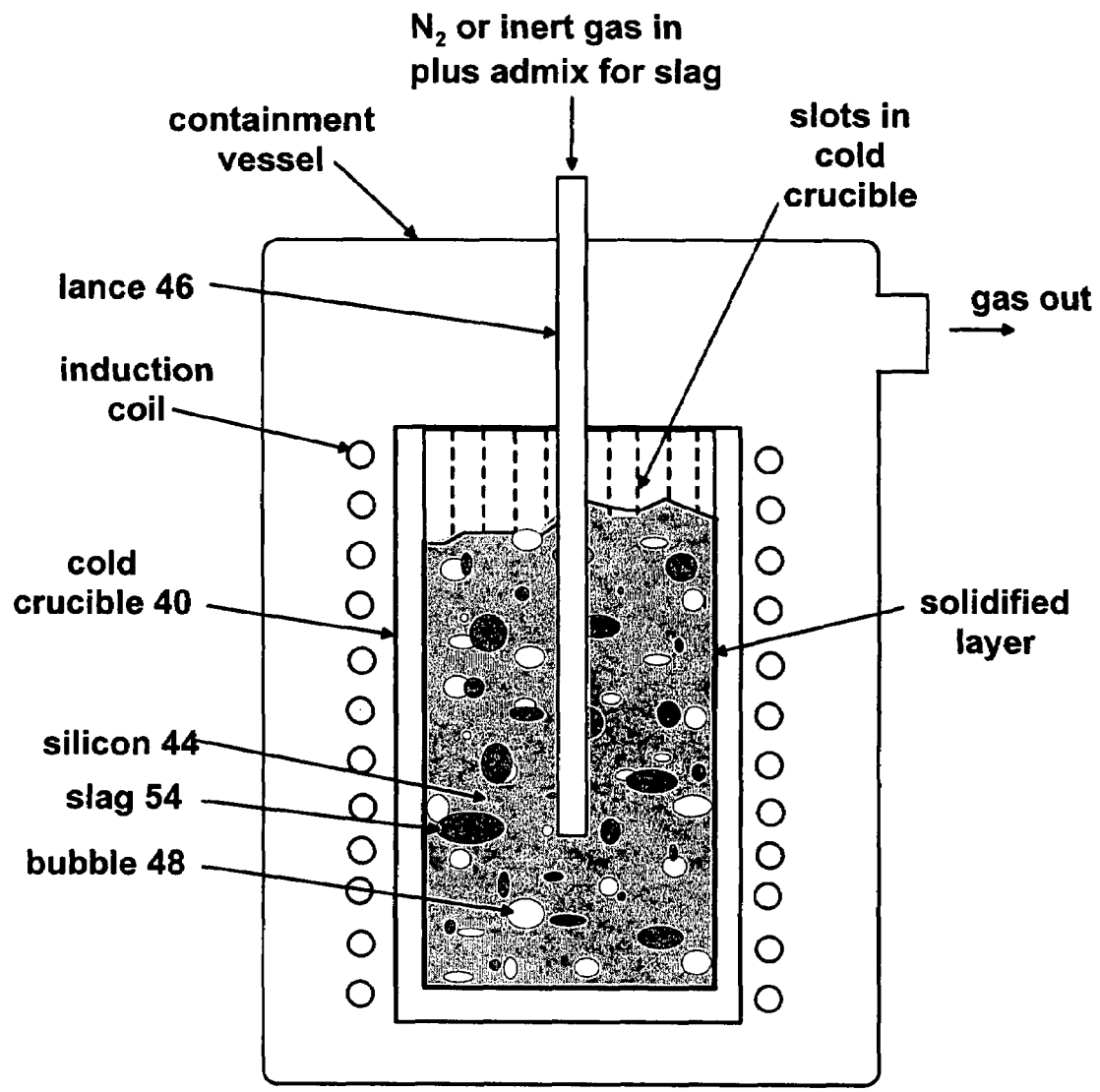
FIGS. 6A and 6B are cross-sectional views of a cold-crucible induction heater in the version of the refining process that uses a slag, with nitrogen or an inert gas and other materials being added to the molten silicon using a lance and a torch, respectively.
Figure 6B:
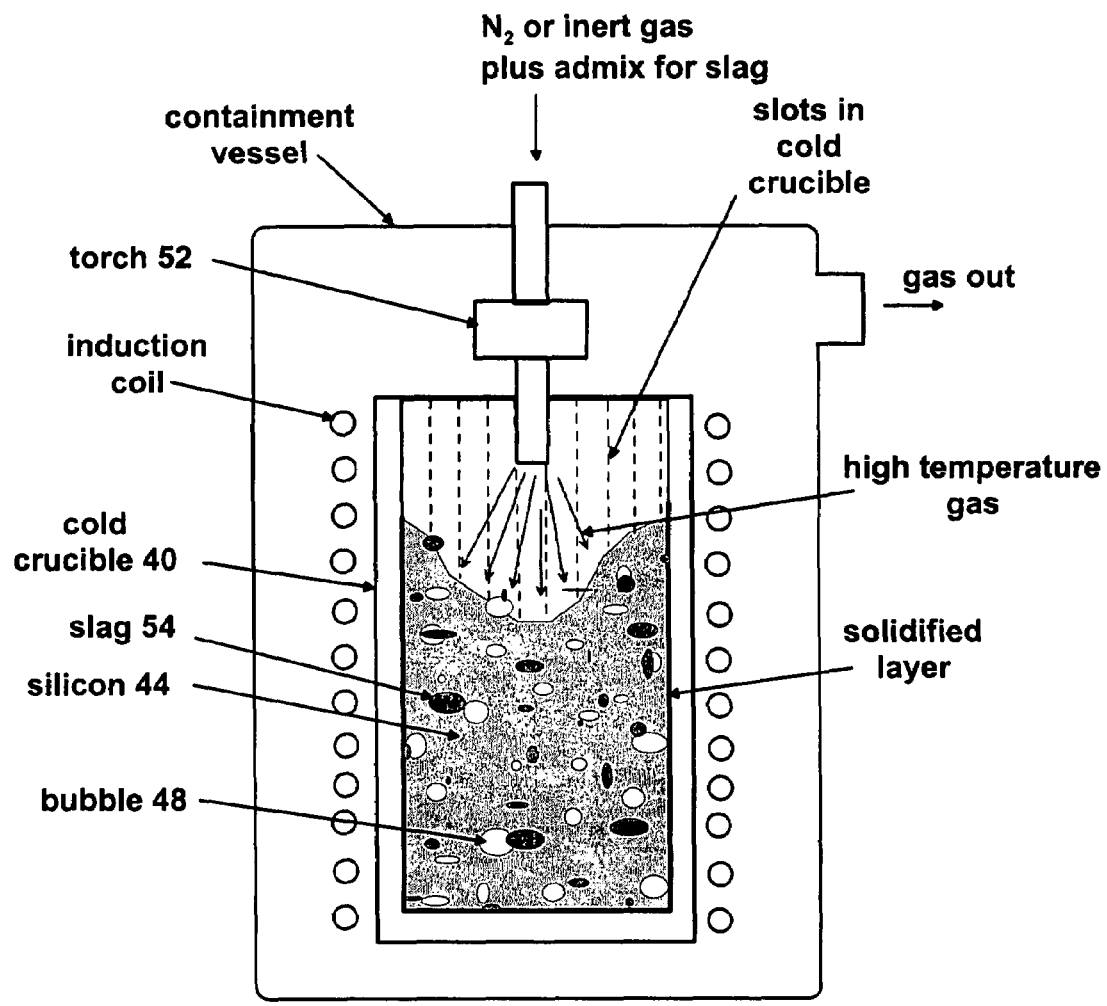

FIG. 6A shows cold-crucible 40 during the refining process, with $N_2$ or an inert gas along with the fluxing agents being added to molten silicon 44 using lance 46. Also shown in FIG. 6A are pockets of the oxy-nitride slag 54 that are being agitated and mixed with molten silicon 44 by the action of the $N_2$ and/or inert gas bubbles 48. FIG. 6B is a similar view of cold-crucible 40 during the refining process, with torch 52 used to inject the $N_2$ or inert gas and the fluxing agents.

The following reaction generally describes the formation of the slag.

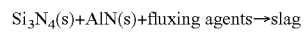

The slag is typically a liquid that is more viscous than the molten silicon and not miscible with the molten silicon. The slag has a high activity ($\alpha_{Si_3N_4}$) of silicon nitride, which promotes the removal of boron, but a low activity of silica, which ensures that adsorbed oxygen on the silicon does not block the refining reactions, described below.

After the slag begins to form, the molten silicon and slag are cooled to a temperature in the range 1630 to 1950 K, preferably 1630 K to 1880 K, at a pressure of from 0.01 bar to 3 bar. (Box 16) There are advantages to having the temperature of the slag just slightly above the fusion temperature of silicon (1686 K). It may be useful to add a small amount of aluminum to the silicon (e.g., 5% to 10% by weight) to decrease the fusion temperature of the silicon further and thereby allow refining to occur at temperatures as low as 1630 K. This reduction in temperature increases the thermodynamic ability of the slag to dissolve BN and AlP.

Purified $N_2$ or inert gas may continually be bubbled through the melt to improve the contact between the silicon and the slag. The reduction in temperature leaves the silicon supersaturated in nitrogen, forming $Si_3N_4$. That nitrogen also reacts with boron, forming BN which dissolves in the slag.

$$\underline{B}+\underline{N} \rightarrow BN(slag)$$

In addition, silicon nitride in the slag reacts with the dissolved boron to form BN $$Si_3N_4(slag)+4\underline{B} \rightarrow 4BN(slag)+3Si(l)$$

Through these reactions, the boron dissolved in the silicon ends up in the slag, where its activity is reduced. These reactions are favored by lower temperatures, with optimal refining conditions expected in the range from 1630 K to near 1800 K.

Similarly, if aluminum dissolved in the silicon is used as the refining agent for phosphorus, the melt is preferably reduced to a temperature near that of the fusion temperature of the silicon, but can be as high as 1800 K. The dissolved aluminum and phosphorus then react to form aluminum phosphide, which enters the slag where its activity is reduced $$\underline{Al}+\underline{P} \rightarrow AlP(slag)$$

Alternatively, if $Al_2O_3$ is used as the refining agent for phosphorus, the melt is preferably set at a somewhat higher temperature, e.g., a temperature in the range of 1730 K to 1880 K. The $Al_2O_3$ in the slag, which has a high thermodynamic activity ($\alpha_{Al_2O_3}$), reacts with phosphorus dissolved in the silicon, forming aluminum phosphide in the slag, as well as oxygen gas.

$$Al_2O_3(slag)+2\underline{P} \rightarrow 2AlP(slag)+1.5O_2(g)$$

If $Al_2O_3$ is used as the refining agent to remove phosphorus first (i.e., before the boron removal), it may be desirable to dispose of the phosphorus-containing slag separately before proceeding with the boron removal process, which would typically be performed at a somewhat lower temperature. Reducing the temperature could cause the phosphorus to reenter the silicon, and this possibility is avoided by removing the slag before the temperature is reduced for boron refining.

Mixing the silicon and slag favors the above reactions. This may be done by continuing to bubble purified nitrogen or an inert gas through the silicon or by mechanically stirring the silicon and slag with, for example, a silicon carbide impeller. The induction heating also tends to mix the silicon and slag.

If $Al_2O_3$ is used as the refining agent for phosphorus, a molar ratio of $Al_2O_3$ to AlN of 3 to 1 or higher should be maintained. However, it is also desirable to maintain a significant concentration of AlN in the slag, as AlP will substitute for AlN in the slag, reducing the activity of AlP in the slag and making the slag a better chemical sink for phosphorus. If too much AlN(s) forms, and $Al_2O_3$ is used as the refining agent for phosphorus dissolved in the molten silicon, it may be necessary to remove the slag containing the boron from the melt and use a separate slag for the removal of phosphorus. Reducing the pressure of $N_2$ while raising the temperature of the silicon limits the formation of AlN.

When the concentrations of boron and phosphorus in the silicon have been reduced, the temperature of the silicon is reduced to 1700 K, for example, and the flow of purified nitrogen gas or inert gas is reduced or terminated.

The reduction of the nitrogen flow lessens the mixing of the silicon and slag, and the slag begins to coalesce. Normally, significant $Al_2O_3$ content in the slag makes its density greater than that of the silicon, and the slag sinks to the bottom of the crucible. If $Al_2O_3$ is used as the refining agent for phosphorus, cooling the melt to 1700 K causes the slag to solidify. If aluminum is used as the refining agent for phosphorus, the slag remains liquid but nonetheless normally sinks to the bottom of the crucible.

The molten silicon may then be decanted into another vessel for further refining. The slag, if solidified, is then reheated to its fusion temperature and poured from the cold crucible for disposal. The cold crucible is then cooled and readied for reuse. A residual slag coating may be allowed to remain on the surface of the crucible so long as the impurity levels in the coating are not so high as to unduly contaminate the silicon in future process cycles.

If the process yields a slag that is less dense than the silicon, the slag will solidify on top of the molten silicon upon cooling. It can then be removed by drossing or raking it from the surface, or a hole can punched in the solidified slag layer to allow the molten silicon to be poured into another vessel. Alternatively, alumina may be added to the slag to increase its density and make it sink. Adding alumina, however, risks reducing the solubility of boron and phosphorus in the slag and reversing the refining process.

The refining process typically reduces the concentrations of boron and phosphorus from approximately 30 ppma to the levels required for solar-grade silicon. Table 2 illustrates the typical concentrations of the various impurities (in ppma) at this stage of the process.

TABLE 2

| Impurity | m-Si (after B and P refining) |
|---|---|
| Al | $5 \times 10^3$-$10^5$ |
| B | 0.01-3 |
| C | 700 |
| Ca | 590-1000 |
| Cr | 50-140 |
| Cu | 24-90 |
| Fe | 1600-3000 |
| Mg | 100-500 |
| Mn | 70-80 |
| Mo | 1-10 |
| N | 8-50 |
| Ni | 40-80 |
| P | 0.01-1.0 |
| Ti | 140-200 |
| V | 100-200 |

Refining Using Solid Discard Phase

As an alternative to forming a slag, boron and/or phosphorus may be removed from the silicon by passing the molten silicon though a bed of solids containing a nitrogen-containing compound and/or an aluminum-containing compound. The nitrogen-containing compound may include $Si_3N_4$ and/or AlN. The aluminum-containing compound may include $Al_2O_3$ and/or AlN. The bed may also include CaO and MgO to assist in the removal of phosphorus and to achieve favorable conditions for the refining reactions to take place. The solids may be pieces from 2 mm to 10 mm in diameter, for example. The molten silicon is typically at a temperature of 1630 K to 1880 K.

This process is preferably performed after the nitriding process (see above) although in some cases it may be possible to omit the nitriding process.

It is believed that boron dissolved in the silicon combines with the $Si_3N_4$ to form BN through the following reaction (($\beta_{ss}$) stands for solid solution).

$$Si_3N_4(\beta_{ss})+4\underline{B} \rightarrow 4BN(\beta_{ss})+3Si(l)$$

Thus as boron enters the solid pieces, the amount of $Si_3N_4$ in solid solution decreases and is replaced by BN in solid solution.

Nitrogen and boron dissolved in the molten silicon also combine and enter the solid $Si_3N_4$ pieces as a solution of BN $$\underline{N}+\underline{B} \rightarrow BN(\beta_{ss})$$

The presence of AlN in the solid solution not only tends to stabilize BN in the solid phase, it can also react with boron dissolved in the silicon drawing it directly into the solid solution by the reaction $$\underline{B}+AlN \rightarrow BN(\beta_{ss})+\underline{Al}$$

Further, it is believed that phosphorus dissolved in the molten silicon substitutes for the oxygen in the $Al_2O_3$ pieces, forming AlP and releasing oxygen gas, $$Al_2O_3(\beta_{ss})+\underline{P} \rightarrow 2AlP(\beta_{ss})+1.5O_2(g)$$

and aluminum and phosphorus dissolved in the molten silicon combine to form AlP which enters the pieces of solid solution $$\underline{Al}+\underline{P} \rightarrow AlP(\beta_{ss})$$

Similarly as with boron, the presence of AlN in the solid solution not only tends to stabilize AlP in the solid phase, it can also react with phosphorus dissolved in the silicon drawing it directly into the solid solution by the reaction $$\underline{P}+AlN \rightarrow AlP(\beta_{ss})+\underline{N}$$

If pieces of CaO and MgO are included in the bed, it is believed that the following reactions occur to assist in the removal of phosphorus $$3CaO(\beta_{ss})+2\underline{P} \rightarrow Ca_3P_2(\beta_{ss})+1.5O_2(g)$$

$$3MgO(\beta_{ss})+2\underline{P} \rightarrow Mg_3P_2(\beta_{ss})+1.5O_2(g)$$

The presence of calcium and magnesium dissolved in the silicon can also react with phosphorus in the silicon by the reactions $$3\underline{Ca}+2\underline{P} \rightarrow Ca_3P_2(\beta_{ss})$$

$$3\underline{Mg}+2\underline{P} \rightarrow Mg_3P_2(\beta_{ss})$$

This process may be operated continuously, and it may be operated at low temperatures approaching the melting point of silicon (1686 K or lower if Al is dissolved in the silicon), which improves the refining action of Al for P when both are dissolved in silicon. In addition, the composition of the solid bed may be varied with respect to position so as to use the optimum conditions to remove B and P separately. The bed may be structured, with respect to composition, by having strata so as to remove boron and phosphorus separately, but with the optimum composition for refining of the silicon with respect to the bed material, so as to achieve the greatest extent of removal of boron and phosphorus from silicon using a single vessel. The temperature along the length of the bed can also be varied to achieve greater removal of phosphorus and boron from silicon.

Figure 7:
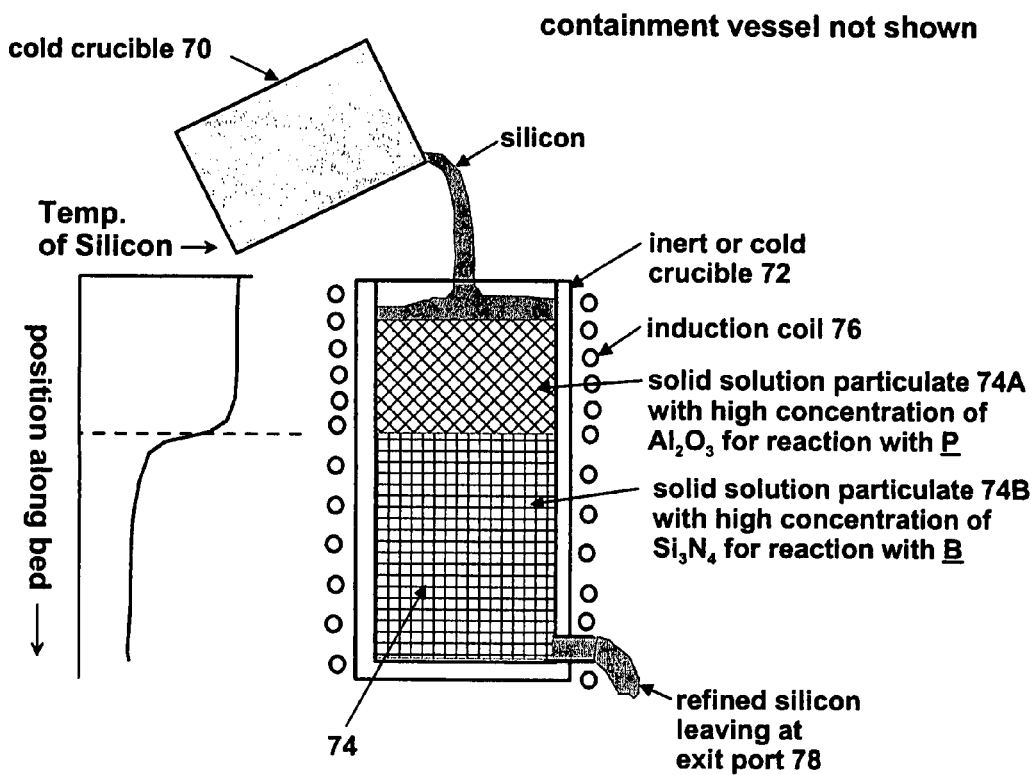
FIG. 7 is a cross-sectional view of a cold-crucible containing a bed of solids in the version of the refining process that uses a solid discard phase.

FIG. 7 illustrates the solid discard process. Molten silicon, pretreated as described above, is poured from a first cold-crucible 70 into a second cold-crucible 72, which contains a bed 74 of solid solution particulate. The silicon is heated by an induction coil 76 as in flows downward through bed 74 toward an exit port 78 at the bottom of cold-crucible 72. The upper portion 74A of bed 74 contains solid solution particulate having a high concentration of $Al_2O_3$ for removing phosphorus; the lower portion 74B of bed 74 contains solid solution particulate having a high concentration of $Si_3N_4$ for removing boron. As indicated by the temperature graph to the left of cold-crucible 72, induction coil 76 maintains the silicon in the upper portion of bed 74 at a higher temperature than the silicon in the lower portion of bed 74, thus optimizing the temperature of the silicon for the removal of phosphorus and boron, respectively. The temperature of the silicon in the upper portion of bed 74 may be in the range 1800 K to 1880 K, whereas as the temperature of the silicon in the lower portion of bed 74 may be just above the fusion temperature of silicon.

Using the solid discard process, the amount of boron in the molten silicon may be reduced to 0.001 ppma to 3 ppma and the amount of phosphorus in the molten silicon may be reduced to 0.01 ppma to 1.0 ppma.

Oxidative Refining and SiC Settling

At the conclusion of the phosphorus-removal process, with aluminum dissolved in silicon as the refining agent, the silicon typically contains significant aluminum content (e.g., 5,000-100,000 ppma). Since it is difficult to remove Al by directional solidification (described below), it may be necessary to perform oxidative refining to reduce the Al content to about 3,000 ppma. (Box 18) Reducing the Al content to about 3000 ppma ensures that the Silgrain process (described below) can further reduce the Al content to a level suitable for directional solidification. Oxidative refining is generally described, for example, in Anders Schei et al., *Production of High Silicon Alloys*, Tapir Forlag, Trondheim, Norway (1998) pp. 233-246.

Oxidative refining may be performed on the molten silicon immediately after it is decanted or otherwise separated from the slag at the end of the boron and/or phosphorus refining process.

Oxidative refining may be carried out in a cold crucible with or without heating capability, a quartz-lined cold crucible, or a silicon carbide crucible. The oxidation refining process itself produces sufficient heat, provided that adequate thermal resistance to heat transfer is provided by lining the interior surface of the cold crucible. For example, pre-treating the cold crucible by spray-coating it with MgO and then solidifying a layer of Si on the MgO provides an adequate thermal barrier to the heat generated by oxidation. The solidified silicon in effect acts as an inner containment vessel. Moreover, solidifying a layer of Si eliminates thermo-chemical restrictions that might otherwise need to be considered owing to the potential of reactions between the molten Si and the crucible material. No lining is necessary with a silicon carbide crucible.

Air, or oxygen enriched air, is bubbled through the molten silicon, using an alumina lance, for example. The oxygen in the air reacts with the silicon to produce $SiO_2$ $$Si(l)+O_2(g) \rightarrow SiO_2(l)$$

and the liquid $SiO_2$ reacts with the aluminum, magnesium and calcium dissolved in the silicon to produce $Al_2O_3$, MgO and CaO by the following reactions $$1.5SiO_2(l)+2\underline{Al} \rightarrow Al_2O_3(slag)+1.5Si(l)$$

$$SiO_2(l)+2\underline{Mg} \rightarrow MgO(slag)+Si(l)$$

$$SiO_2(l)+2\underline{Ca} \rightarrow CaO(slag)+Si(l)$$

Some of the dissolved metal content in the molten silicon will be directly oxidized by $O_2$ in the air. Approximately 10% of the molten silicon may be lost as $SiO_2$ in the slag.

Fluxing agents such as CaO are then added to reduce the viscosity of the slag so that it can be removed by drossing, raking, or tapping. A slag with about 30 % wt CaO has a minimum viscosity. The oxidation process produces heat, raising the temperature of the melt. At the elevated temperature it may be necessary to add additional CaO that will decompose with calcium redissolving in the silicon so as to provide a sufficiently high Ca to Fe molar ratio for the Silgrain process (described below). The temperature of the silicon at this stage may be in the range of 1680 K to 2000 K, preferably 1680 K to 1900 K. The pressure is typically about 1 bar.

The air flow is cut off when the aluminum content of the silicon reaches about 3000 ppma. This can be done, for example, by performing a spark analysis on a sample of the silicon. Slag and dross, typically floating on the top of the silicon, are removed.

Additional CaO is added, as necessary, to achieve the necessary ratio of Ca to Fe for the Silgrain process. The CaO decomposes, with the calcium dissolving in the silicon and the oxygen reacting with the silicon to produce $SiO_2$.

Figure 8:
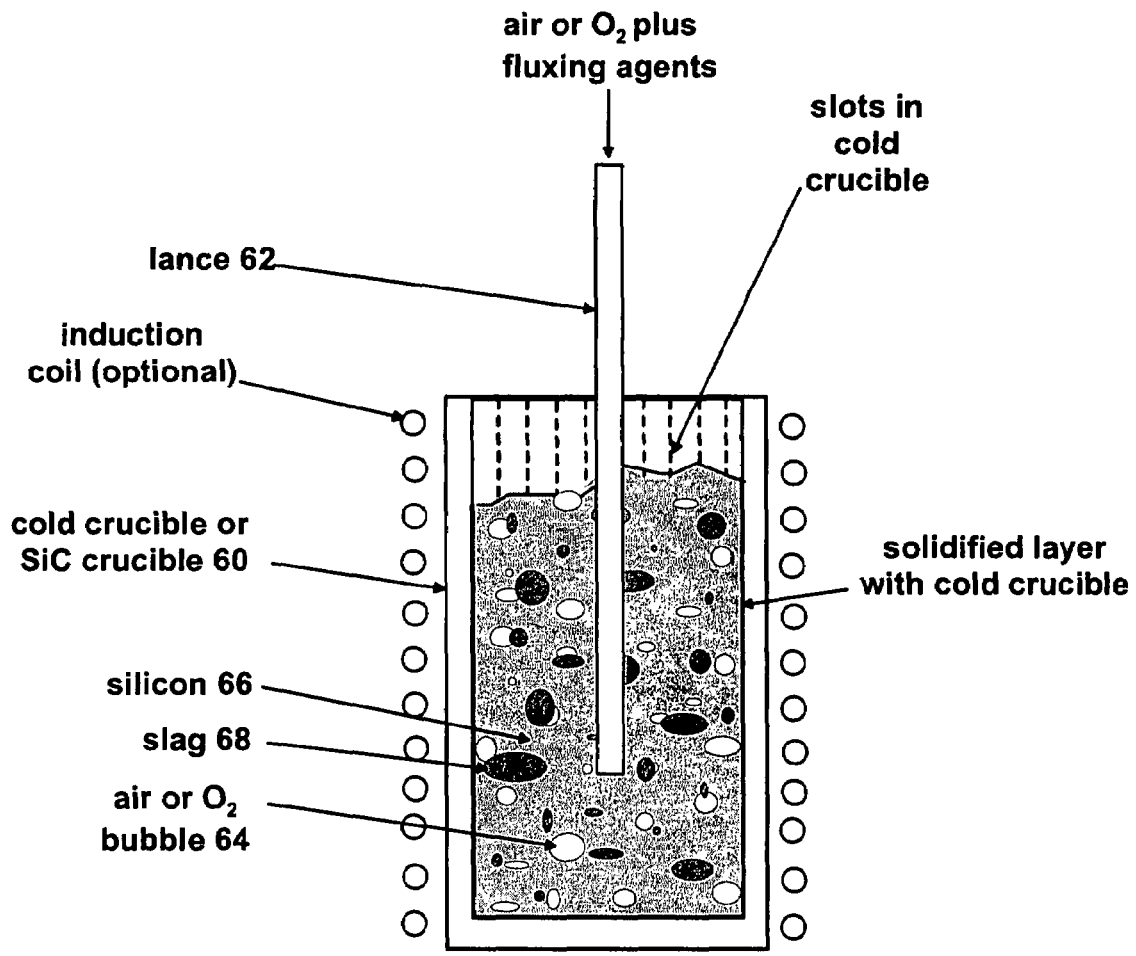
FIG. 8 is a cross-sectional view of a cold-crucible induction heater during the oxidative refining process, with air or oxygen and fluxing agents being added to the molten silicon using a lance.

FIG. 8 is a cross-sectional view of a cold-crucible or SiC crucible 60 during the oxidative refining process. A lance 62 is used to inject air or $O_2$ along with the fluxing agents to form bubbles 64 in the molten silicon 66. Pockets of the $Al_2O_3/MgO/CaO/SiO_2$ slag 68 are also shown.

Following the oxidative refining process, the silicon is cooled. If the carbon content is below 60 ppma (the maximum acceptable concentration for solar-grade silicon), the cooling may take place quickly.

If the carbon content is above 60 ppma, a SiC settling process may be performed. (Box 20) As the silicon cools, dissolved carbon combines with silicon to produce SiC particles.

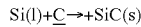

Since the density of SiC is greater than the density of molten Si, the SiC particles settle to the bottom of the vessel. Provided that convection is kept to a minimum, a 10 µm SiC particle settles at a rate of 0.18 m/hr, while a 15 µm SiC particle settles at a rate of 0.4 m/hr.

At high concentrations of carbon, it may be desirable to add SiC particles to the molten silicon to accelerate the SiC settling process. The discard dust obtained from the wire-sawing of silicon ingots, for example, contains Si and SiC particles at a ratio of about 9:1 on a mass basis. The SiC particles, about 10 µm in diameter, eliminate the need for SiC nucleation, growing SiC larger particles that settle faster. The addition of the dust has the side benefit of increasing the mass and purity of the silicon produced.

During the addition of the SiC particles an insulated lid is placed over the crucible and the water flow through the cold-crucible, if utilized, is adjusted to minimize natural convection in the silicon. The SiC settling process normally takes about 1 to 1.5 hours. The temperature during the SiC settling is typically in the range 1680 K to 1780 K, preferably about 1700 K. The pressure is about 1 bar. Optionally, at the conclusion of the SiC settling process the cooling rate may be increased at the bottom of the cold crucible, thereby increasing the thickness of the solidified silicon layer and trapping the SiC particles within that layer.

A SiC or quartz crucible can also be used in the settling process.

Figure 9:
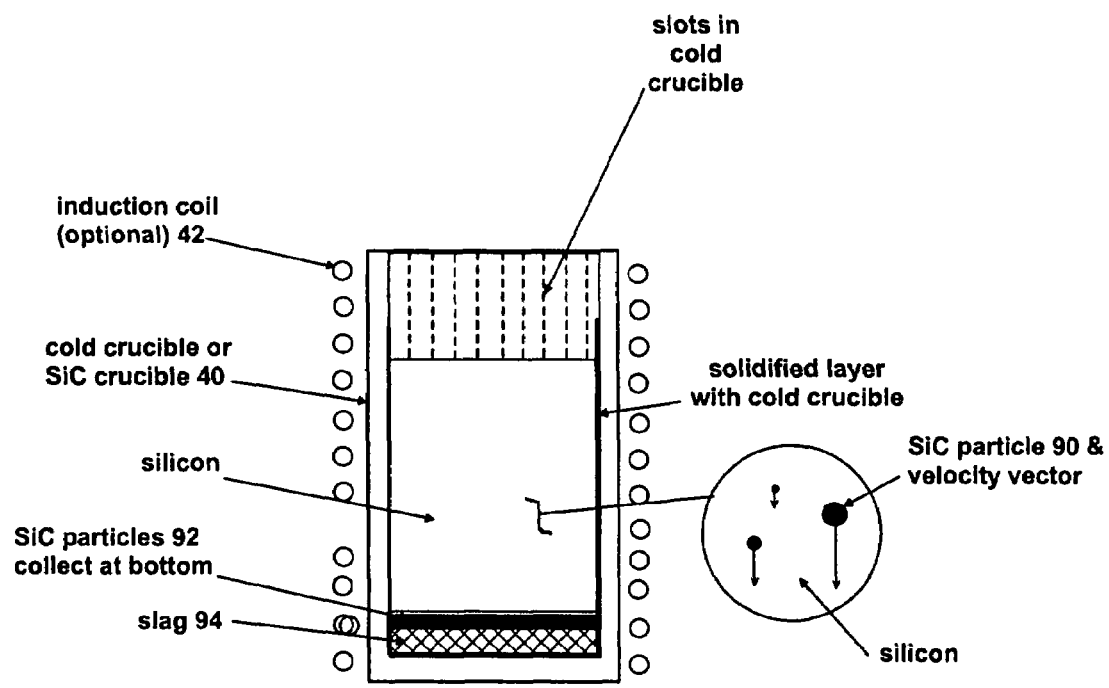
FIG. 9 is a cross-sectional view of a cold-crucible containing the molten silicon during the SiC settling process.

The SiC settling process is illustrated in FIG. 9, where SiC particles 90 are shown settling into a layer 92 at the bottom of cold-crucible 40. A layer 94 of the slag from the oxidative refining process is also shown.

Whether or not a SiC settling process is performed, when the molten silicon has cooled sufficiently it is poured into shallow molds. (Box 22) Preferably, this is done at temperatures of approximately 1690 to 1700 K. After the silicon has been poured, the crucible is cooled and readied for reuse.

Figure 3:
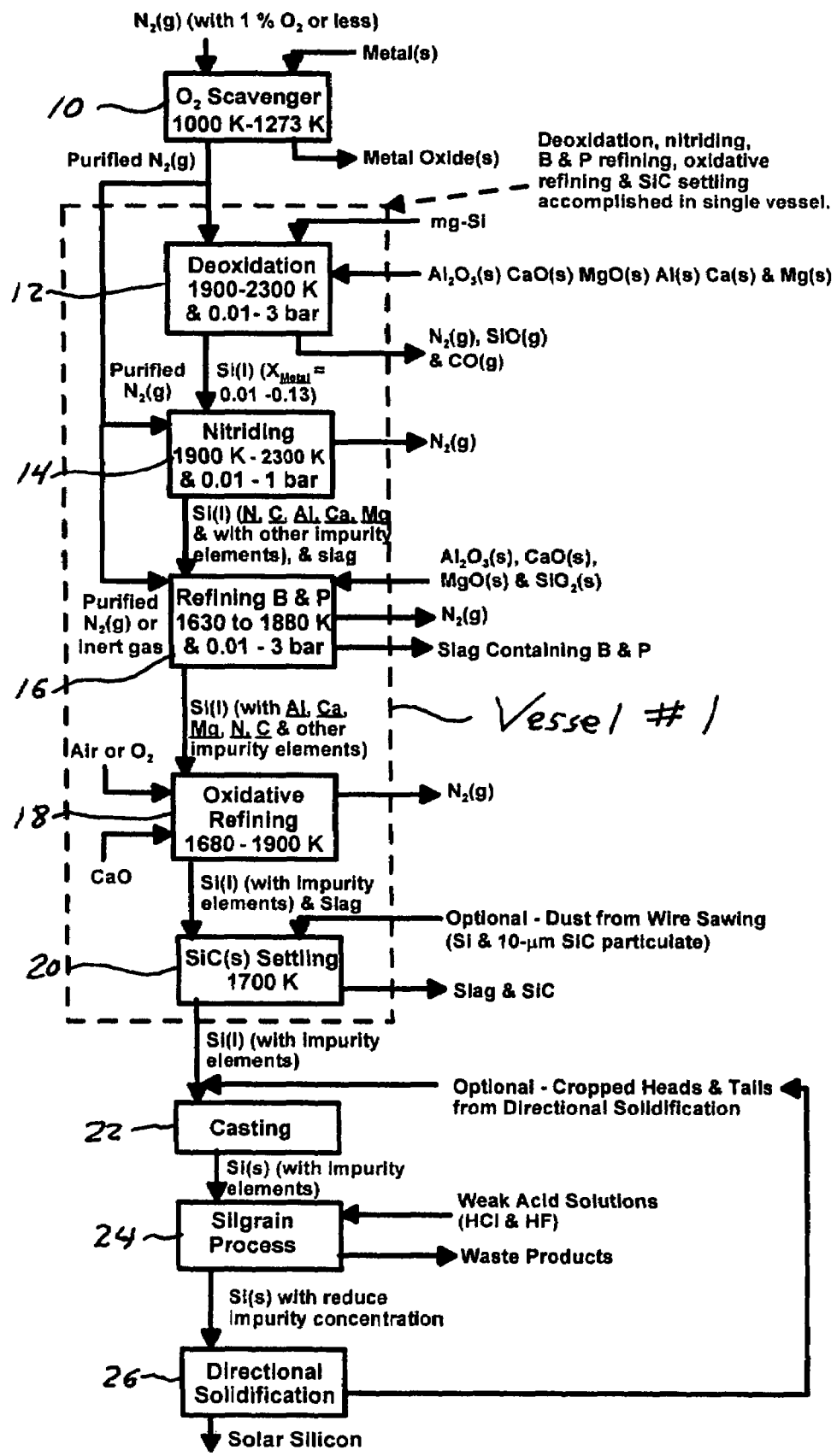
FIG. 3 contains a more detailed flow chart of the process, using a single vessel for the deoxidation, nitriding, boron and phosphorus refining, and oxidative refining processes.

As shown in the flow chart of FIG. 3, the deoxidation, nitriding and refining processes (boxes 12, 14 and 16) may alternatively be performed in the same vessel as the oxidative refining and SiC settling processes (boxes 18 and 20). Except for the use of only a single vessel, the processes themselves are similar to those performed in the two-vessel embodiment.

Silgrain Process

Following oxidative refining and SiC settling (if required), the silicon still contains levels of Al, Fe, Ti, V and other impurities that are higher than acceptable for solar-grade silicon.

Some of these impurities can be removed by the Silgrain process. (Box 24) In order to perform the Silgrain process, the molar ratio of Ca to Fe must be 14:1 or greater.

When silicon with this concentration ratio of Ca to Fe is solidified, it forms large primary Si crystals held together by thin layers of calcium disilicide ($CaSi_2$). Small crystals of other impurities are trapped in the $CaSi_2$ layers. When this material is treated with a dilute aqueous solution of hydrochloric acid (HCl) and iron chloride ($FeCl_3$), the $CaSi_2$ forms a yellow phase that swells, separating the silicon crystals. The yellow phase (and the impurities trapped therein) is washed away with water, leaving purified silicon crystals surrounded by a thin film of $SiO_2$, which also contains some impurities. The $SiO_2$ film and impurities are then washed away with a weak hydrofluoric (HF) acid solution.

The Silgrain process is described in U.S. Pat. No. 4,539,194 and in Anders Schei et al., *Production of High Silicon Alloys*, Tapir Forlag, Trondheim, Norway (1998) pp. 285-291, both of which are incorporated herein by reference.

Directional Solidification

Following the Silgrain process, several impurities still remain at levels that are unacceptable for solar-grade silicon. These impurities can be removed by directional solidification (box 26), which is described, for example, in Anders Schei et al., *Production of High Silicon Alloys*, Tapir Forlag, Trondheim, Norway (1998) pp. 291 et seq., which is incorporated herein by reference.

The silicon from the Silgrain process is melted and cooled in a quartz crucible. The temperature of the crucible is slowly lowered so that the silicon at the bottom of the crucible cools first, while the upper layer remain molten. Most of the impurities are trapped at the bottom and at the top of the silicon ingot that is formed by this process. The tops and bottoms (tails) are cut from the ingot, leaving a relatively pure mid-section. To increase the purity of the silicon, the directional solidification stage (DSS) may be repeated more than once.

The tops and tails that are removed in the directional solidification process may be added back into the molten silicon during oxidative refining or as the silicon is poured into molds after the oxidative refining process. The impurities that remain in the tops and tails are the same impurities that are, to a large extent, removed by the Silgrain process.

Table 3 lists the concentrations of impurities (in ppma) in metallurgical-grade silicon, after the oxidative refining and Silgrain processes, and after a single-pass directional solidification.

TABLE 3

| Impurity | m-Si | After oxidative refining & Silgrain process | After single pass DSS |
| --- | --- | --- | --- |
| Al | 1200-4000 | 15-30 | 0.5-1 |
| B | 10-50 | 0.01-3 | 0.01-3 |
| C | 700 | 25-60 | 25-60 |
| Ca | 590 | 220-310 | 2-3 |
| Cr | 50-140 | $\leq 140$ | 0.001-0.1 |
| Cu | 24-90 | 24-90 | 0.02-0.1 |
| Fe | 1600-3000 | 100 | 0.01-0.1 |
| Mn | 70-80 | 70-80 | 0.001-0.1 |
| Mo | $\leq 10$ | $\leq 10$ | $5 \times 10^{-7}$-$5 \times 10^{-3}$ |
| Ni | 40-80 | 40-80 | 0.001-0.01 |
| P | 15-50 | 0.01-1.0 | 0.01-1.0 |
| Ti | 140-200 | 4-6 | $6 \times 10^{-6}$-$1 \times 10^{-3}$ |

It should be noted that the Ca content can be reduced further by a second oxidative refining step prior to directional solidification, or by using an electron beam to heat and fuse the silicon while exposing it to a vacuum at 1700 K for a period of 30 minutes at the beginning of the directional solidification process. See T. Ikeda et al., "The Application of Electron Beam Technique for the Purification of Silicon for Photovoltaic Material," Proceedings of the Conference on Electron Beam Melting and Refining-State of the Art, Bakish Materials Corp. (1998) pp. 101-109. It is also possible to reduce the calcium content to 0.03 ppma with a second directional solidification step.

EXAMPLE 1

Example 1 contains a description of a typical process according to the invention which uses a slag and two vessels for deoxidation, nitriding and refining for boron and phosphorus, oxidative refining and SiC settling.

1. Metallurgical-grade silicon is charged to the cold crucible in the vacuum chamber. Any combination of $Al_2O_3$, CaO, MgO, Al, Ca, or Mg is included in the charge to achieve the desired level of a. Al dissolved in the silicon for phosphorus refining.

b. Al dissolved in the silicon for AlN formation during and after nitriding. AlN dissolves in the slag.

c. Al, Ca, and Mg dissolved in the silicon to maintain a highly reducing condition during boron and phosphorus refining.

2. The chamber is sealed, then evacuated with a mechanical pump to 0.01 bar, and then back filled with purified $N_2$ to a pressure of 1 bar or higher. This process may be repeated several times to effectively remove any residual air remaining in the chamber. The $N_2$ entering the chamber is purified by passing it through a bed of hot metal turnings to remove $O_2$, $H_2O$, CO, and $CO_2$.

3. A graphite donut is positioned above the silicon pieces in the cold crucible, and the power to the induction coil turned on. The graphite heats the upper layer of the silicon. At a temperature above 700 K the silicon acts as a susceptor and the graphite donut can be withdrawn. The silicon is heated to between 1950 K and 2050 K at a pressure of 0.01 bar. During this period the chamber is continually purged with purified $N_2$. The purified $N_2$ enters the chamber through a lance that is lowered into the fused silicon so as to stir the melt with nitrogen gas bubbles. Oxygen dissolved in the silicon reacts with the silicon to form SiO(g) thereby removing the oxygen from the silicon.

If a combination of torch and induction heating are used, the torch replaces the use of the graphite donut. The $N_2$ passing through the torch is impinged on the surface of the melt where local heating is as high as 2700 K. At that temperature the adsorbed oxygen is instantly removed and nitrogen dissolves in the silicon. The gas jet from the torch serves to both stir it and to saturate the silicon with nitrogen. As that occurs, silicon, saturated with nitrogen, flows away from the hot spot and cools, and gas bubbles and $Si_3N_4$ form. SiO(g) enters the bubbles, and as with the lance, oxygen is removed from the melt. With the torch the optimum pressure is between 0.1 bar and 1 bar and the optimum temperature is between 2000 K to 2300 K.

4. As the concentration of oxygen in the silicon decreases, nitrogen begins to dissolve in the silicon and the pressure of $N_2$ in the chamber can be raised to achieve the desired solubility of nitrogen in the silicon.

5. The nitriding continues with nitrogen entering the silicon and also reacting with the melt to form $Si_3N_4$ and AlN.

6. The melt is cooled to between 1630 K and 1880 K and fluxing agents are added to form a slag of desired composition. The admixture for the slag is added through the lance (or torch) with the $N_2$ or inert gas or directly charged to the top of the melt. The slag forms as a result of reaction between the admixture and the nitrides ($Si_3N_4$ and AlN).

7. $N_2$ or an inert gas is used to mix the silicon and slag during the refining process for removal of boron and phosphorus.

8. After achieving the desired boron and phosphorus content in the silicon, the slag is allowed to float on top of the silicon or settle to the bottom of the cold crucible.

If the slag floats it is removed and further processing can be achieved in the same crucible, or the silicon can be transferred to a second cold crucible (or any inert crucible). If the slag settles to the bottom the silicon is carefully decanted into the second crucible.

If the silicon is transferred to a second crucible, the crucible used for deoxidation, nitriding, and boron and phosphorus refining is cooled and prepared for another heat.

9. The silicon, during oxidative refining, can be heated by induction if necessary.

10. Oxidative refining is achieved by blowing air into the silicon through a lance to oxidize the Al, Ca, and Mg dissolved in the melt. This can be done in a crucible open to air. Fluxing agents can be added with the air to form a slag. It is desirable to add sufficient CaO so as to achieve the desired calcium content in the silicon for Silgrain processing.

11. When the concentrations of Al and Mg dissolved in the silicon are reduced to an acceptable level, the blowing of air through the silicon is stopped and the slag and silicon are allowed to separate.

12. If the slag floats on top of the silicon, it is removed. If the slag sinks to the bottom of the silicon it is allowed to remain there during the SiC settling process.

13. If necessary, further calcium oxide can then be added to the melt to raise the Ca to Fe ratio in the silicon to that level suitable for the Silgrain process. The CaO decomposes, with the calcium dissolving in the silicon, and the oxygen in the oxide forming silica or SiO(g).

14. The silicon is allowed to stand and cool to 1690 K to 1720 K, while SiC solid particles form and settle to the bottom of the crucible. Wire sawing dust that contains SiC particles can be added to assist in SiC particle formation and growth. At the end of the settling period, additional cooling through the bottom portion of the cold crucible can be used to trap the SiC particles is a layer of solidified silicon or slag (the former case occurs as a result of removing the oxidative refining slag and the latter case occurs when the slag sinks to the bottom of the crucible).

15. The molten silicon is decanted into a shallow mold and allowed to solidify. Care is taken in the pouring process to limit the transfer of SiC particles to the mold.

16. The crucible can now be prepared for another heat.

17. The solidified silicon is broken into pieces for treatment in the Silgrain process, a commercial method for purification of silicon. The Silgrain process is described in U.S. Pat. No. 4,539,194 and in Anders Schei et al., *Production of High Silicon Alloys*, Tapir Forlag, Trondheim, Norway (1998) pp. 285-291.

18. The purified silicon from the Silgrain process is further refined by directional solidification, an established commercial process that combined with the processes described above yields a solar-grade silicon. Description of directional solidification can be found in Anders Schei et al., *Production of High Silicon Alloys*, Tapir Forlag, Trondheim, Norway (1998) pp. 291 et seq, and in Kurz Fisher, *Fundamentals of Solidification*, Trans Tech Publications, Aedermannsdor, Switzerland (1984), pp.121-142.

EXAMPLE 2

Example 2 contains a description of a typical process according to the invention using a solid discard phase. Deoxidation and nitriding are the same as described in Example 1 with some slight modifications.

Refining for boron and phosphorus takes place in a separate vessel. The melt is cooled to between 1700 K and 1880 K and then passed through a bed of particulate consisting of the $\beta_{ss}$ (solid discard phase) to remove boron and phosphorus. The particulate is prepared in advance and is used in a near continuous process after which the particulate is removed and replaced with new particulate. The solid phase consists of a solid solution formed from $Si_3N_4$, $Al_2O_3$, AlN, MgO, and CaO. The solids are pieces from 2 mm to 10 mm in diameter. The bed is structured, with respect to composition, by having strata so as to remove boron and phosphorus separately, but with the optimum composition for refining of the silicon with respect to the bed material, so as to achieve the greatest extent of removal of boron and phosphorus from silicon using a single vessel. The temperature along the length of the bed is varied to achieve greater removal of phosphorus and boron from silicon. Specifically, for phosphorus refining a layer of solid solution rich in $Al_2O_3$ at higher temperatures (1800 K-1 880 K). is provided, whereas for boron refining a layer of solid solution rich in $Si_3N_4$ at a temperature just above the fusion temperature of silicon is provided. Depending on the density of the solid solution with respect to molten silicon, the silicon is either allowed to flow down or to rise up through the bed.

The silicon upon leaving the vessel containing the $\beta_{ss}$ particulate is transferred to the oxidative refining crucible.

The oxidative refining and SiC settling processes are the same as those described in Example 1.

The embodiments of this invention described above are intended to be illustrative, and not limiting. Many alternative embodiments will be obvious to persons of skill in the art. The broad scope of this invention is defined only by the following claims.

We claim:

1. A process for removing boron from silicon comprising:
   heating the silicon to form molten silicon;
   adding nitrogen or a nitrogen-containing compound to the silicon;
   adding aluminum or an aluminum-containing compound to the silicon;
   creating an oxy-nitride slag in the molten silicon, the slag including aluminum nitride;
   causing boron dissolved in the silicon to react with the nitrogen or nitrogen-containing compound and to enter the slag in a compound containing nitrogen, the compound containing nitrogen comprising boron nitride, the aluminum nitride in the slag reducing the activity of the boron nitride in the slag; and
   separating the slag from the silicon.

2. The process of claim 1 wherein causing boron dissolved in the silicon to enter the slag is performed at a temperature in the range of 1630 K to 1880 K.

3. The process of claim 1 wherein the slag comprises $Si_3N_4$.

4. A process for removing phosphorus from silicon comprising:
   heating the silicon to form molten silicon;
   adding aluminum to the silicon;
   creating a slag in the molten silicon, the slag including a nitrogen-containing substance and an aluminum-containing substance;
   causing phosphorus dissolved in the silicon to enter the slag in a compound containing aluminum; and
   separating the slag from the silicon.

5. The process of claim 4 wherein causing phosphorus dissolved in the silicon to enter the slag is performed at a temperature in the range of 1630 K to 1880 K.

6. The process of claim 4 wherein the aluminum-containing substance comprises $Al_2O_3$.

7. A process for removing impurities from silicon comprising:
   heating the silicon to form molten silicon;
   adding nitrogen to the silicon;
   adding aluminum to the silicon;
   creating a slag in the molten silicon, the slag including a nitrogen containing substance and an aluminum-containing substance;
   causing boron dissolved in the silicon to enter the slag in a nitrogen-containing compound;
   causing phosphorus dissolved in the silicon to enter the slag in a compound containing aluminum; and
   separating the slag from the silicon.

8. The process of claim 7 comprising removing oxygen dissolved in the molten silicon.

9. The process of claim 8 wherein removing oxygen dissolved in the molten silicon comprises:
   heating the molten silicon to a temperature in the range 1900 K to 2300 K; and
   injecting a gas into the molten silicon to form bubbles.

10. The process of claim 9 comprising removing oxygen from the gas prior to injecting the gas into the molten silicon.

11. The process of claim 10 wherein removing oxygen from the gas comprises:
    heating an oxygen scavenger to a temperature in the range 1000 K to 1273 K, the oxygen scavenger being at least one material selected from the group consisting of Cr, Mn, Ti, Al, Mg, Ca, Si, Cu, Co, Ni, Fe, FeO and $Fe_3O_4$; and
    passing the gas over the oxygen scavenger.

12. The process of claim 11 wherein the oxygen scavenger comprises Cu.

13. The process of claim 7 wherein adding nitrogen to the silicon comprises injecting nitrogen gas into the silicon.

14. The process of claim 7 wherein adding aluminum to the silicon comprises adding $Al_2O_3$ or metallic Al to the silicon.

15. The process of claim 7 wherein creating a slag comprises adding a fluxing agent to the silicon, the fluxing agent comprising at least one material selected from the group consisting of $Al_2O_3$, $SiO_2$, CaO and MgO.

16. The process of claim 7 wherein adding nitrogen to the silicon is performed at a temperature of 1900 K to 2300 K and causing boron dissolved in the silicon to enter the slag is performed at a temperature in the range 1630 K to 1800 K.

17. The process of claim 16 wherein the nitrogen-containing compound comprises BN.

18. The process of claim 7 wherein adding aluminum to the silicon comprises adding metallic aluminum to the silicon at a temperature of 1900 K to 2300 K and wherein causing aluminum dissolved in the silicon to enter the slag is performed at a temperature in the range 1630 K to 1800 K.

19. The process of claim 18 wherein the compound containing aluminum comprises AlP.

20. The process of claim 7 wherein adding aluminum to the silicon comprises adding $Al_2O_3$ to the silicon and wherein causing aluminum dissolved in the silicon to enter the slag is performed at a temperature in the range 1730 K to 1880 K.

21. The process of claim 20 wherein the compound containing aluminum comprises AlP.

22. The process of claim 7 wherein the slag comprises at least one material selected from the group consisting of $Si_3N_4$, $Al_2O_3$ and AlN.

23. The process of claim 4 wherein the aluminum-containing substance comprises aluminum nitride and the compound containing aluminum comprises aluminum phosphide, the aluminum nitride reducing the activity of the aluminum phosphide in the slag.

24. The process of claim 1 wherein the silicon has a boron concentration in the range of 0.1 to 3 parts per million atomic immediately after separating the slag from the silicon.

25. The process of claim 24 wherein the silicon has a boron concentration in the range of 10-50 parts per million atomic at the commencement of heating the silicon.

26. The process of claim 4 wherein the silicon has a phosphorus concentration in the range of 0.1 to 1 parts per million atomic immediately after separating the slag from the silicon.

27. The process of claim 26 wherein the silicon has a phosphorus concentration in the range of 15-50 parts per million atomic at the commencement of heating the silicon.

28. The process of claim 7 wherein the silicon has a boron concentration in the range of 0.1 to 3 parts per million atomic and a phosphorus concentration in the range of 0.1 to 1 parts per million atomic immediately after separating the slag from the silicon.

29. The process of claim 28 wherein the silicon has a boron concentration in the range of 10-50 parts per million atomic and a phosphorus concentration in the range of 15-50 parts per million atomic at the commencement of heating the silicon.

30. The process of claim 4 wherein the nitrogen-containing substance in the slag comprises AlN and/or $Si_3N_4$.

31. The process of claim 7 wherein the nitrogen containing substance in the slag comprises AlN and/or $Si_3N_4$.

* * * * *